United States Patent [19]
Baker et al.

[11] Patent Number: 5,940,610
[45] Date of Patent: Aug. 17, 1999

[54] USING PRIORITIZED INTERRUPT CALLBACK ROUTINES TO PROCESS DIFFERENT TYPES OF MULTIMEDIA INFORMATION

[75] Inventors: David C. Baker; Michael D. Asal, both of Austin, Tex.; Jonathan I. Siann, San Diego, Calif.; Paul B. Wood; Jeffrey L. Nye, both of Austin, Tex.; Stephen G. Glennon, Cedar Park, Tex.; Matthew D. Bates, Austin, Tex.

[73] Assignee: Brooktree Corporation, San Diego, Calif.

[21] Appl. No.: 08/720,891

[22] Filed: Oct. 3, 1996

Related U.S. Application Data

[60] Provisional application No. 60/004,837, Oct. 5, 1995.

[51] Int. Cl.⁶ .................................................. G06F 13/00
[52] U.S. Cl. ..................... 395/559; 395/557; 395/878; 395/733; 395/800.01
[58] Field of Search ........................ 395/733, 551–560, 395/878–881, 821, 800.01

[56] References Cited

U.S. PATENT DOCUMENTS

| | | | |
|---|---|---|---|
| 4,580,165 | 4/1986 | Patton et al. | 358/148 |
| 4,742,350 | 5/1988 | Ko et al. | . |
| 4,868,548 | 9/1989 | Gelvin | 340/709 |
| 4,954,819 | 9/1990 | Watkins | 340/721 |
| 4,994,912 | 2/1991 | Lumelsky et al. | 358/140 |
| 5,001,469 | 3/1991 | Pappas et al. | 340/721 |

(List continued on next page.)

FOREIGN PATENT DOCUMENTS

| | | | |
|---|---|---|---|
| 0 524 468 A2 | 1/1993 | European Pat. Off. | G09G 5/14 |
| 0 597 218 A1 | 5/1994 | European Pat. Off. | G09G 1/16 |
| 0 601 647 A1 | 6/1994 | European Pat. Off. | G09G 1/16 |
| 0 675 478 A1 | 10/1995 | European Pat. Off. | G09G 1/16 |
| WO93/21574 | 10/1993 | WIPO | G06F 3/14 |

OTHER PUBLICATIONS

Digital Video Processor, Video–Port Interface Techniques, draft May 17, 1993, Pixel Semiconductor.

M. Leonard, Teleconferencing Invades the Desktop, Electronic Design, Aug. 6, 1992, pp. 47, 48, 50, 51.

Copies of Presentation Slides, Pixel Semiconductor, Jun. 1992.

Digital Video Processor, Preliminary Data Book, Jul. 1993, pp. C00001–C00229.

MediaDAC™, Pixel Semiconductor, CS–PX2080 Preliminary Data Book, Sep. 1993, pp. C00117–C00181.

i750™ Microprocessor Family, Intel Corp., 1991, pp. BT035378–BT035496.

*Primary Examiner*—Christopher B. Shin
*Attorney, Agent, or Firm*—Fish & Richardson P.C.

[57] ABSTRACT

Multimedia information (e.g. graphics, video, sound, control information) passes through a system bus from a CPU main memory to a display memory in accordance with CPU commands. The information may be packetized with associated packet types identifying the different media. A media stream controller processes the information and passes the processed information to the display memory. Controllers in the media stream controller individually pass multimedia information to the display memory. A PACDAC controller in the media stream controller causes media (e.g. graphics, video) in the display memory to be transferred to a PAC-DAC for display. The format, sequence, and rate of this transfer may be flexibly controlled by software on a frame by frame basis. Arbitration logic establishes priorities for the different controllers in the media stream controller so they may share a single bus for accessing the display memory. A single interrupt controller coordinates interrupts (e.g. at a single level) to provide priorities based upon the type of interrupt cause or media. Each interrupt cause activates only the appropriate callback functions. Two different virtual machine sessions (e.g. Windows, DOS) share an interrupt line to process interrupt requests form one (1) session (e.g. Windows) before processing interrupt requests from the other.

1 Claim, 17 Drawing Sheets

U.S. PATENT DOCUMENTS

| | | | |
|---|---|---|---|
| 5,220,312 | 6/1993 | Lumelsky et al. | 340/721 |
| 5,243,447 | 9/1993 | Bodenkamp et al. | 345/133 |
| 5,245,322 | 9/1993 | Dinwiddie, Jr. et al. | 345/115 |
| 5,257,348 | 10/1993 | Roskowski et al. | 395/157 |
| 5,258,750 | 11/1993 | Malcolm, Jr. et al. | 340/721 |
| 5,274,753 | 12/1993 | Roskowski et al. | 395/135 |
| 5,327,243 | 7/1994 | Maietta et al. | 348/565 |
| 5,335,321 | 8/1994 | Harney et al. | 395/162 |
| 5,432,905 | 7/1995 | Hsieh et al. | 395/162 |
| 5,440,683 | 8/1995 | Nally et al. | 395/162 |
| 5,488,390 | 1/1996 | Reinert et al. | 345/145 |
| 5,502,837 | 3/1996 | Hoffert | 395/550 |
| 5,542,038 | 7/1996 | Schafer | 395/139 |
| 5,553,220 | 9/1996 | Keene | 395/154 |
| 5,576,951 | 11/1996 | Lockwood | 395/227 |
| 5,577,203 | 11/1996 | Reinert et al. . | |
| 5,581,280 | 12/1996 | Reinert et al. . | |
| 5,625,379 | 4/1997 | Reinert et al. . | |
| 5,640,332 | 6/1997 | Baker et al. | 364/514 |
| 5,692,211 | 11/1997 | Gulick et al. | 395/800 |
| 5,715,437 | 2/1998 | Baker et al. | 395/507 |
| 5,717,904 | 2/1998 | Ehlers et al. | 395/511 |
| 5,732,224 | 3/1998 | Gulick et al. | 395/280 |
| 5,732,279 | 3/1998 | Wood et al. | 395/821 |
| 5,748,203 | 5/1998 | Tang et al. | 345/521 |
| 5,748,921 | 5/1998 | Lambrecht et al. | 395/308 |
| 5,752,010 | 5/1998 | Herbert | 395/509 |
| 5,754,801 | 5/1998 | Lambrecht et al. | 395/308 |
| 5,754,807 | 5/1998 | Lambrecht et al. | 395/308 |
| 5,758,177 | 5/1998 | Gulick et al. | 395/800.01 |
| 5,790,110 | 8/1998 | Baker et al. | 345/707 |
| 5,805,173 | 9/1998 | Glennon et al. | 345/501 |

400

| 402 | PKT_ORDR | PACKET ORDERING CONTROL |
| --- | --- | --- |
| 404 | GD_PNTR | POINTER TO START OF GRAPHICS DATA |
| 406 | GD_Y_END | SCREEN ROW END + 1 |
| 408 | GD_Y_STRT | SCREEN ROW STARTING POSITION |
| 410 | GD_PTCH | PITCH OF GRAPHICS DATA |
| 412 | GD_X_CNT | DWORDS PER SCREEN ROW |
| 414 | V_PNTR | POINTER TO START OF VIDEO DATA |
| 416 | V_Y_END | ENDING ROW + 1 |
| 418 | V_Y_STRT | STARTING ROW |
| 420 | V_PTCH | PITCH OF VIDEO DATA |
| 422 | V_X_CNT | DWORDS PER SCREEN ROW |
| 424 | V_Y_SINC | Y SCALE INCREMENT |
| 426 | TS_PNTR | POINTER TO TIMING STRUCTURE |
| 428 | TS_LENG | TOTAL NUMBER TIMING ATOMS |
| 430 | CLK_MOD | CLOCK MODULATION |

FIG. 4

| PRIORITY | AGENT | RESPONSE IF NOT ACKNOWLEDGED | REASON FOR PRIORITY |
|---|---|---|---|
| (1) | PACDAC CONTROLLER 918 | NEVER DENIED | MUST REPAINT SCREENS; DISPLAY INTEGRITY |
| (2) | MEMORY REFRESH MODULE 908 | ACCUMULATE IN A COUNTER → WILL REQUEST TWO THE NEXT TIME (HOLDS REQUEST) | ALL DATA INTEGRITY |
| (3) | VIDEO INPUT INTERFACE 903 | DROPS A FRAME (DROPS REQUEST) | TO MINIMIZE VIDEO INPUT FIFO SIZE |
| (4) | AUDIO MODULE 906 | PLAYBACK → (HOLDS REQUEST UNTIL ACKNOWLEDGED) RECORD → SAMPLE IS DROPPED & GETS OVERWRITTEN BY NEXT INPUT (HOLDS REQUEST LINE) | AUDIO INTEGRITY, BUT CAN BE LOWER SINCE SLOWER I/O |
| (5) | NTSC/PAL VIDEO OUT 907 | CAN'T RECOVER → TURN OFF EVERYTHING BUT PACDAC & REFRESH ARE OFF WHEN DOING NTSC/PAL OUTPUT SO THIS WON'T OCCUR- HIGH BANDWIDTH CONSUMER | ONCE YOU START EFFECTIVELY HAS A HIGHER PRIORITY SINCE OTHER MODULES TURNED OFF |
| (6) | MEDIA BUFFER ACCESS CONTROLLER 909 | HOLD REQUEST UNTIL ACKNOWLEDGED | PERFORMS AUXILIARY OPERATION |
| (7) | VGA CONTROLLER 904 GUI ACCELERATOR 914 (NOTE VGA & GUI ARE MUTUALLY EXCLUSIVE, ONLY ONE IS USED AT A TIME) | HOLD REQUEST UNTIL GETS ACKNOWLEDGED AND SENDS | VERY HIGH BANDWIDTH SO WILL DOMINATE UNLESS LOW PRIORITY |

FIG. 13

USING PRIORITIZED INTERRUPT CALLBACK ROUTINES TO PROCESS DIFFERENT TYPES OF MULTIMEDIA INFORMATION

REFERENCE TO RELATED APPLICATION

The present application claims priority from provisional application Ser. No. 60/004,837 filed Oct. 5, 1995. Provisional application Ser. No. 60/004,837 is hereby incorporated herein by reference in its entirety.

BACKGROUND OF THE INVENTION

1. Field of the Invention

The field of the present invention relates in general to a system for, and method of, multimedia processing in a computer system. More particularly, the field of the invention relates to a system and method for controlling priority and timing for processing different types (e.g. graphics, video, sound, etc.) of multimedia information, preferably in packets individually identifying (via headers, associated tags or the like) the different types of multimedia information.

2. Background

Personal computers and work stations have evolved rapidly since their introduction nearly twenty years ago. Dramatic advances in processor, display and audio technology have transformed the personal computer into a multimedia appliance, capable of combining color graphics, video, and stereo sound in a single software application.

However, most conventional systems require separate bus devices to support graphics, video, and sound. In fact, most sound devices are attached to the expansion bus, while graphics and video devices have migrated to the local bus to take advantage of higher data transfer rates.

Unfortunately, this piecemeal approach to providing multimedia capabilities has led to the development of separate graphics, video, and audio subsystems having independent controllers with incompatible data types. This may lead to wasted memory space and memory bandwidth, duplicated bus interface logic, and wasted CPU cycles to manage independent subsystems.

A significant problem with conventional approaches has been that different types of multimedia information have been stored in different memories. For example, sound information has been stored in one (1) memory for subsequent processing and graphics and video information has been stored in another memory. This has prevented each memory from being used efficiently. It has also caused the multimedia system to be relatively expensive and to occupy a relatively large amount of space.

A further significant problem exists in conventional systems. This results from the fact that information for the different types of media has not been packetized. This prevents efficient identification and processing of information relating to the different types of multimedia information. It also inhibits the information relating to the different types of media from being mixed into a single stream.

An additional significant disadvantage in conventional systems has been that each different type of media has been provided with its own independent interrupt line to control the processing of that media. This has limited the number of interrupt lines available for other uses. It has also resulted in the use of additional pins or connectors in the system and additional complexity in the configuration and installation of the system.

What is needed is an apparatus and method for combining graphics, video, and audio in a single bus device, using a single bus interface. Preferably, such a system would allow the sharing of a single buffer and other components for use in various multimedia applications, including audio, graphics, video input, and video output. Preferably, such a system would also allow the format and processing of multimedia information to be flexibly controlled by software.

SUMMARY OF THE INVENTION

Aspects of the present invention provide a system which overcomes the problems discussed above. It provides for a unified and consistent processing of the different types of multimedia information. It provides the information in packetized form with a packet type identifying the different types of multimedia information. It provides for the storage of the different types of the multimedia information in a single display memory and for the processing of these different types of information on a cyclical basis in a particular sequence. The sequence and data transfer rate may be flexibly controlled by software. The software may store control information in the shared display memory to control the sequence, format and rate of processing on a frame by frame basis. The system also establishes a priority in the transfer of individual ones of the different types of the multimedia information to the display memory at each instant and in the processing of the different types of information in the display memory and in the refreshing of the information in the display memory.

In one embodiment of the invention, multimedia information (e.g. graphics, sound) passes through a system bus from a CPU main memory to a display memory in accordance with CPU commands. The information may be packetized with a packet type individually identifying the different types of media. A media stream controller processes the information from the system bus and passes the processed information to the display memory.

Controllers in the media stream controller individually pass multimedia information to the display memory. A PACDAC controller in the stream controller provides, for the different media in the display memory, controlled transfer from the display memory to a PACDAC. The sequence and rate of this transfer may be modified by software on a frame by frame (or in some embodiments on a line by line) basis. The PACDAC converts the data to analog form for display.

Arbitration logic in the media stream controller establishes priorities for transferring data between the different controllers and the display memory at each instant. For example, the PACDAC controller and a memory refresh controller may respectively have the first and second priorities. The arbitration logic also establishes a bus protocol so the various media subsystems may share a single bus for accessing the display memory.

A single interrupt controller coordinates interrupts (e.g. at a single level) to provide priorities based upon the cause of the interrupt or the type of the media. Each interrupt cause activates only the appropriate callback functions. Two different virtual machine sessions (e.g. Windows and DOS) share an interrupt line to process interrupt requests from one (1) session (e.g. Windows) before processing interrupt requests from the other.

BRIEF DESCRIPTION OF THE DRAWINGS

These and other features and advantages of the present invention will become more apparent to those skilled in the art from the following detailed description in conjunction with the appended drawings in which:

FIG. 4 shows the format of a master control structure used in the exemplary embodiment of FIG. 1;

FIG. 13 is a table describing the priority used to determine access to the Mbus of FIG. 12;

DESCRIPTION

Figure 1:
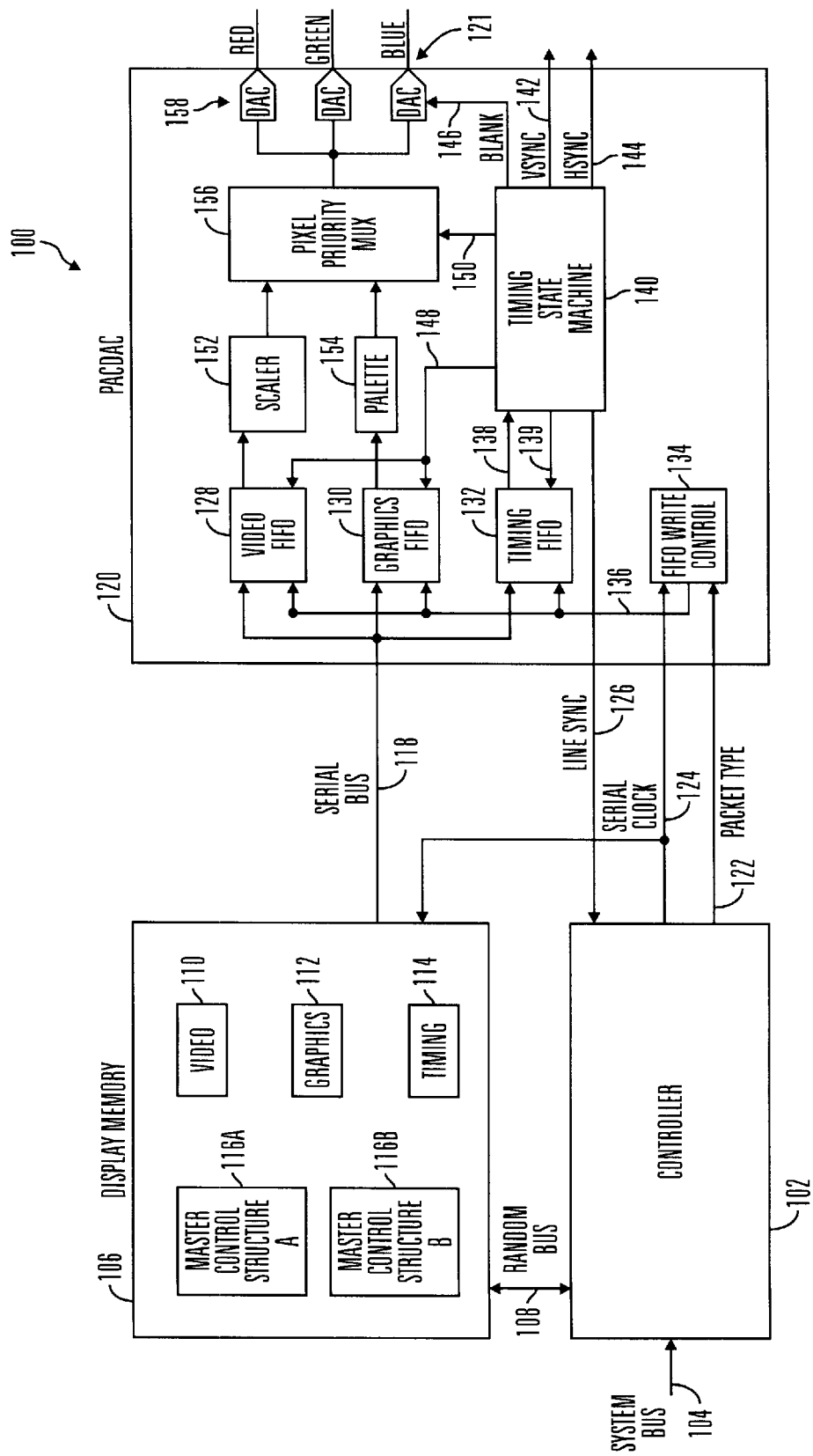
FIG. 1 is a simplified block diagram illustrating a system according to an exemplary embodiment of the present invention for multimedia processing in a personal computer.

FIG. 1 is a simplified block diagram of a multimedia system, indicated generally at 100, according to an exemplary embodiment of the present invention. System 100 processes and routes multimedia information in packets of different media types. System 100 has three exemplary packet types, video, graphics and timing information. System 100 is a simplified system for illustrative purposes and other embodiments described below use additional packet types.

System 100 comprises a controller 102 connected to the system bus 104 of a computer. The controller 102 controls the processing of video, graphics and timing packets and provides a memory controller for a display memory 106. A random bus 108 provides communication between the controller 102 and display memory 106. The controller 102 allows a CPU (not shown) on system bus 104 to access data stored in the display memory 106 using memory mapped I/O.

Display memory 106 has different portions for storing video 110, graphics 112, and timing information 114. The display memory 106 also stores master control structures 116a and 116b which contain control information for controller 102. The video 110, graphics 112, timing information 114, and master control structures 116a and 116b are provided by software executing on a CPU (not shown) attached to the system bus 104.

The video 110, graphics 112, and timing information 114 may be output in packets on serial bus 118 and thereby provided to PACDAC 120. The term "PACDAC" refers to a packet based digital-to-analog converter (DAC). The PACDAC uses first-in/first-out buffers (FIFOs) to buffer video, graphics and timing information. PACDAC 120 is a simplified illustrative version of a PACDAC that is described in greater detail and claimed in co-pending application Ser. No. 08/214,787 filed Mar. 16, 1994 (attorney's file D-2717), in the names of David C. Baker and Jonathan I. Siann, titled "Multimedia Graphics System," abandoned in favor of continuation application Ser. No. 08/648,542, filed May 16, 1996, now U.S. Pat. No. 5,640,332 and which is hereby incorporated herein by reference. The video or graphics related packets may be converted to analog form by the PACDAC and output to a video or graphics device via analog output ports 121.

In addition to receiving data and control information across serial bus 118, PACDAC 120 also receives control information from controller 102 across line 122 designated as "Packet Type" in FIG. 1. This control information indicates the type of packet (video, graphics, or timing information) that is being sent to PACDAC 120 across serial bus 118 at any given time. The PACDAC 120 and display memory 106 also receive a serial clock signal from controller 102 across line 124. The serial clock signal determines the rate of data transfer across serial bus 118. A line 126 designated as "linesync" in FIG. 1 is provided from PACDAC 120 to controller 102. The linesync signal indicates when PACDAC 120 is ready to receive additional information (which is typically after the PACDAC has completed processing enough graphics and/or video data to complete a horizontal scan line on a display).

System 100 provides for flexible control of video and graphics processing. The system architecture is also easily expandable to include other types of media (such as cursor information, audio and NTSC or PAL video generation) as described below. Generally, software executing on a CPU (not shown) transfers video and/or graphics information to the video 110 and graphics 112 portions of display memory 106 via controller 102. The software also provides timing information to the timing portion 114 of the display memory 120. The timing information is used by PACDAC 120 to control the output of each horizontal line of video and/or graphics to a display. For each horizontal scan line, timing information indicates the starting position and number of pixels of video and graphics information to display as well as the timing for generating control signals such as blanking and synchronization. Thus, for each horizontal scan line of data to be displayed, timing information is sent to PACDAC 120. Graphics and/or video information are also sent to PACDAC 120 and stored in corresponding FIFOs. The graphics and video data is unloaded from the FIFOs and displayed in accordance with the timing information for the corresponding line.

Software also provides control information to master control structures 116a and 116b in the display memory 106. Each master control structure contains control information for a frame of display data. The controller 102 reads a master control structure for each frame and processes the data to be displayed accordingly. Among other things, the master control structure determines the order that packets of video, graphics and timing information are sent to PACDAC 120 for each horizontal scan line. The master control structure also determines how the timing information is sent to PACDAC 120. The master control structure may cause the same timing information to be sent to PACDAC 120 for multiple horizontal scan lines. For these lines, the position of the video and graphics on each scan line will remain the same. Thus, while PACDAC 120 is directed at processing horizontal lines of display data (i.e., determining the position and extent of video and/or graphics for a given horizontal line), the master control structures 116a and 116b and controller 102 determine the format of a frame vertically (that is, how many times to repeat the same timing information for consecutive horizontal lines). The master control structures can also modify the serial clock signal 124 for selected packet types from frame to frame and thereby adjust the data transfer rate across serial bus 118 for that packet type. As will be described below, carefully controlling the data transfer rate for different types of media allows shorter FIFOs to be used for receiving selected types of data.

The operation of PACDAC 120 will now be described. PACDAC 120 contains three FIFOs for receiving data from serial bus 118, a video FIFO 128, a graphics FIFO 130, and a timing FIFO 132. FIFO write control 134 determines which FIFO 128–132 receives a given packet from the serial bus 118. FIFO write control 134 receives a packet type signal on line 122 and a serial clock signal on line 124 and generates a load signal on line 136 for the FIFO of the appropriate type. In this manner, video packets from display memory 106 are loaded into video FIFO 128, graphics packets are loaded into graphics FIFO 130, and timing packets are loaded into timing FIFO 132.

In order to display a horizontal line of graphics and/or video, timing packets are unloaded from timing FIFO 132 over line 138 and provided to a timing state machine 140. The timing state machine 140 requests a new packet of timing information from timing FIFO 132 by asserting a signal on line 139. The timing packet indicates the type and duration of signals that are generated by the timing state machine 140. The timing state machine 140 may generate graphics control signals including a VSYNC signal on line 142, an HSYNC signal on line 144, and a blank signal on line 146. The timing state machine 140 may also assert a linesync signal on line 126 to indicate to controller 102 that a horizontal line has been completed and the PACDAC 120 is ready for additional data.

The timing state machine also asserts unload signals on line 148 for the video FIFO 128 and graphics FIFO 130 to indicate when video or graphics pixel information should be unloaded from the respective FIFO. In the exemplary embodiment, graphics pixels are unloaded for each active pixel on a horizontal line while video pixels are unloaded only if specifically selected in the timing information (i.e., the current pixel is within a defined video window). Since both graphics and video pixel information are unloaded for pixels within a video window, the timing state machine 140 also generates a priority signal on line 150 to select whether the video pixel information or graphics pixel information should be displayed. In the exemplary embodiment of FIG. 1, the priority signal on line 150 selects a video pixel whenever a video pixel has been unloaded which indicates the current pixel is within a video window. Of course, other more advanced embodiments as described below may use complex logic to generate the priority signal in order to support color keying or multiple overlapping video windows.

When graphics pixel information is unloaded from graphics FIFO 130, palette 154 converts it to three (3) bytes representing the primary colors red, green, and blue (RGB data). When video pixel information is unloaded from video FIFO 128, a scaler 152 may interpolate or scale the information and convert it to the red, green, blue graphics color space (RGB data). Such processing of graphics and video pixel information is described in additional detail in U.S. Pat. No. 5,406,306 which is incorporated herein by reference. The RGB data from both the palette 154 and scaler 152 is provided to pixel priority MUX 156. Pixel priority MUX 156 selects the RGB data from the palette 154 or scaler 152 in accordance with the priority signal on line 150. The selected RGB data is provided to DACs 158. DACs 158 convert the RGB data to analog form for display on a monitor or other display unit.

Figure 2A:
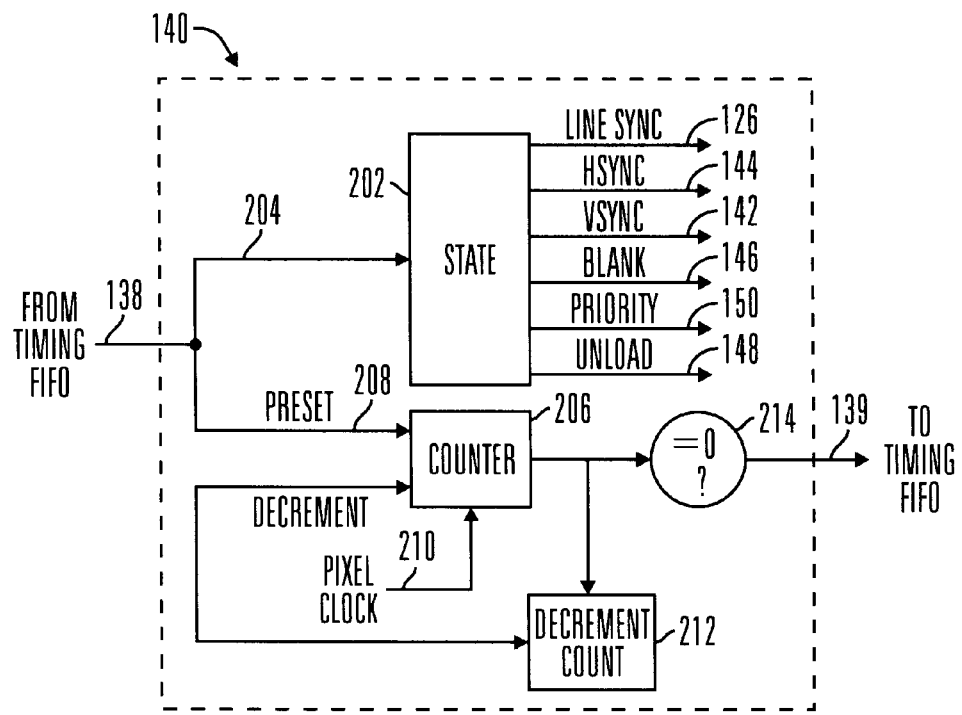
FIGS. 2A and 2B show a timing state machine and timing atom data structure used in the exemplary embodiment of FIG. 1.
Figure 2B:
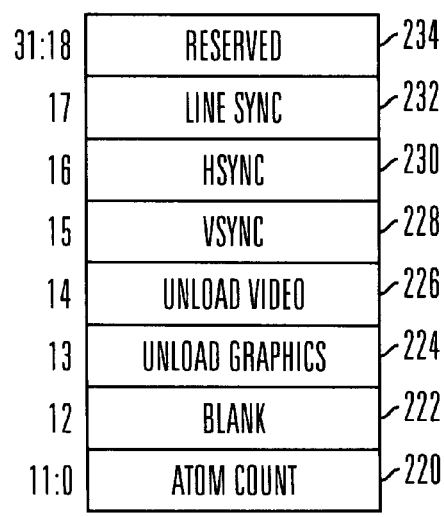

FIG. 2A is a simplified block diagram of a timing state machine 140 according to an exemplary embodiment of the present invention. FIG. 2B illustrates the structure of an exemplary packet of timing information, referred to as a timing atom, according to the exemplary embodiment. As shown in FIG. 2A, a timing atom is received from the timing FIFO 132 on line 138. Information indicating the desired signal for the timing state machine 140 to output (i.e., the desired state of the timing state machine) is provided to state logic 202 over line 204. The state logic asserts the corresponding signal(s) on lines 126–148 until a new state is asserted on line 204. Information indicating the duration to assert a desired state signal is provided to counter 206 over line 208 (designated as "preset" in FIG. 2A). The counter 206 receives a pixel clock signal on line 210, and a decrement count stage 212 decrements the sum in the counter at the rate determined by the pixel clock signal. When the sum in the counter reaches zero as indicated at compare stage 214, a signal is asserted on line 139 to unload the next timing atom from the timing FIFO 132. Thus, the timing atom determines the type of signal output by the timing state machine 140 and the duration of pixel clock cycles that the signal should be asserted.

FIG. 2B illustrates the format of an exemplary timing atom. The first twelve bits indicate an atom count 220 which determines the duration that a given state should be asserted by the timing state machine 140. The atom count is the value initially loaded into counter 206. Each of bits 12 through 17 in the timing atom (labeled 222–232 in FIG. 2B) indicates a signal that should be asserted by the timing state machine 140 (that is, the state to hold until the next timing atom is loaded). In the exemplary embodiment, bits 18 through 31 (labeled 234 in FIG. 2B) are not used, although they may be used to indicate additional states in more advanced embodiments as described below.

Thus, timing atoms may be periodically inserted into the stream of video and graphics packets provided from display memory 106 across serial bus 118. The timing atoms determine the appropriate time and duration for asserting control signals and displaying video and graphics information for a given horizontal scan line of the display unit (not shown).

In system 100, serial bus 118 provides an important data path between the display memory 106 (which may contain a frame or more of display information) and PACDAC 120

(which generally processes display information on a line-by-line basis). With high resolution graphics and video, it is important that the bandwidth of serial bus 118 be used efficiently. In more advanced multimedia systems as described below, it is even more important to optimize this efficiency. As described in application Ser. No. 08/214,787 (now U.S. Pat. No. 5,640,332), system 100 allows the bandwidth of serial bus 118 to be efficiently used throughout the display cycle. Packets of multimedia information may be sent to PACDAC 120 during blanking intervals as well as during active display intervals when pixel information is being sent to the display unit. The FIFOs 128–132 decouple the data transfer rate on serial bus 118 from the pixel clock rate.

Figure 3A:
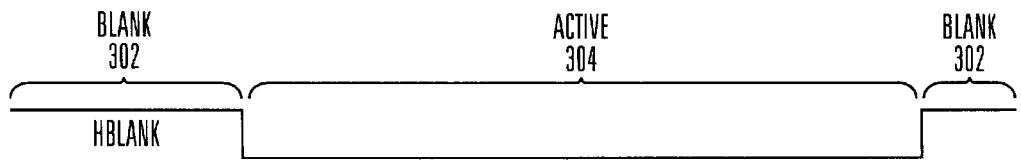
FIG. 3A illustrates sample control signals for a horizontal scan line.
Figure 3B:
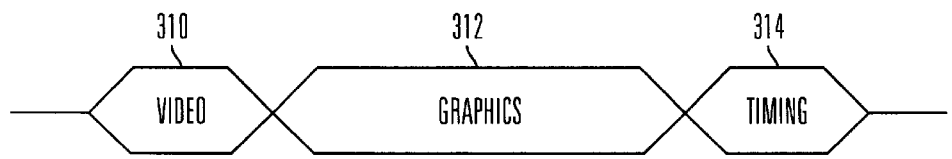
FIG. 3B illustrates a sample packet order for a horizontal scan line in the exemplary embodiment of FIG. 1.
Figure 3C:
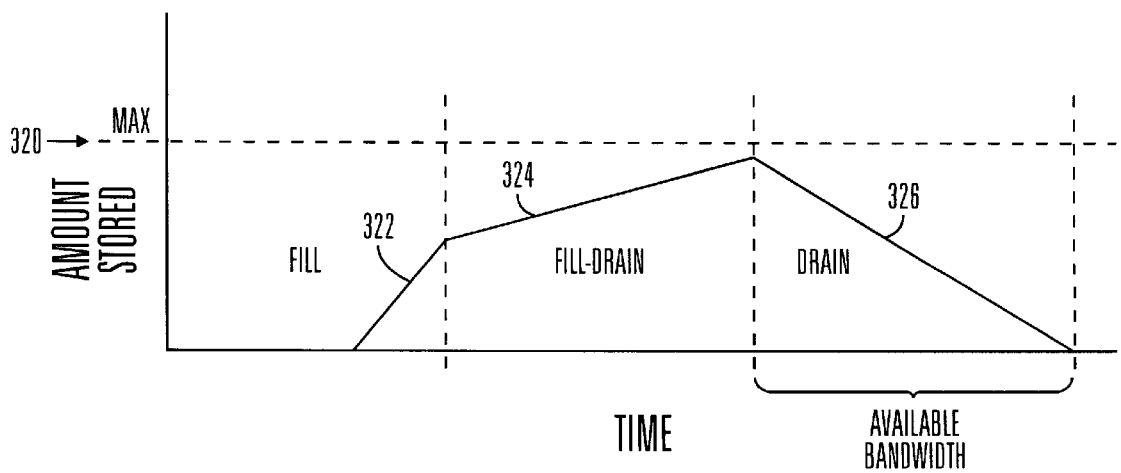
FIG. 3C illustrates sample fill and drain rates for a graphics FIFO in the exemplary embodiment of FIG. 1.

FIGS. 3A–3C illustrate how different packets may be sent to PACDAC 120 during a interval corresponding to a horizontal scan line of the display unit. FIG. 3A illustrates a sample horizontal scan line interval for the display unit (not shown) including a blank interval 302 and an active display interval 304. FIG. 3B illustrates a sample order in which packets may be sent across serial bus 118. Video packets 310 for the current line may be preloaded into the video FIFO 128 during the blank interval 302. Video pixel information will then be unloaded from the video FIFO 128 as needed according to the timing state machine 140. Graphics packets 312 for the current line are then sent to PACDAC 120. In the example of FIGS. 3A–3C, the graphics packets 312 begin being sent during the blank interval 302 and continue being sent for a portion of the active display interval 304. Then timing packets 314 for the next horizontal scan line may be sent to PACDAC 120 and preloaded into timing FIFO 132. Of course, the packets may be sent in other orders. For instance, the timing packets for the current horizontal scan line may be sent during the blank interval before the video and graphics packets. The ordering of the packets sent to PACDAC 120 will be discussed further below. After the timing packets 314 are sent as shown in FIG. 3B, the serial bus 118 is available for other uses. In more advanced embodiments, other types of packets may be sent during this period. For instance, updated color information for palette 154, new values for control registers (not shown), cursor display information, and video information for a second video window may be sent across serial bus 118.

In the exemplary embodiment, graphics information for an entire horizontal scan line is sent to PACDAC 120, although video information for a video window may be displayed for all or a portion of the line instead of the graphics information. When high resolution graphics are displayed, the number of graphics pixels on a line may be substantial. It may be desirable to reduce memory requirements by using a graphics FIFO 130 that holds less than an entire line of graphics information. This may be accomplished by carefully controlling the fill rate of the graphics FIFO 130. FIG. 3C illustrates the fill and drain rates for graphics FIFO 130 for the example of FIGS. 3A–3C. The vertical axis represents the amount of graphics information stored in graphics FIFO 130 and the horizontal axis represents the passage of time. The level indicated at 320 (designated as "max") represents the capacity of graphics FIFO 130. In the exemplary embodiment this capacity is less than a horizontal line of graphics information. During the blank interval 302 the graphics FIFO 130 fills at the rate that packets of graphics information are sent across serial bus 118. This rate is represented by the slope of line 322 designated as "fill" in FIG. 3C. During the active display interval 304, graphics pixel information is unloaded from the graphics FIFO 130 at the pixel clock rate (the drain rate). When graphics information is also being sent across serial bus 118, the amount of information stored in the graphics FIFO 130 increases at the rate represented by the slope of line 324 designated as "fill-drain" in FIG. 3C. After the graphics information has completed being sent across serial bus 118, the graphics FIFO 130 continues to be unloaded for the remainder of the active display interval at the rate indicated by the slope of line 326 designated as "drain" in FIG. 3C. As indicated in FIG. 3C, bandwidth is available on serial bus 118 for other media packets during this drain interval. It should be noted that throughout the horizontal scan line interval the amount of information stored in graphics FIFO 130 never exceeds the capacity indicated at 320, thus allowing a graphics FIFO less than a line long to be used. As a result, the FIFO memory capacity required for PACDAC 120 is reduced.

Figure 3D:
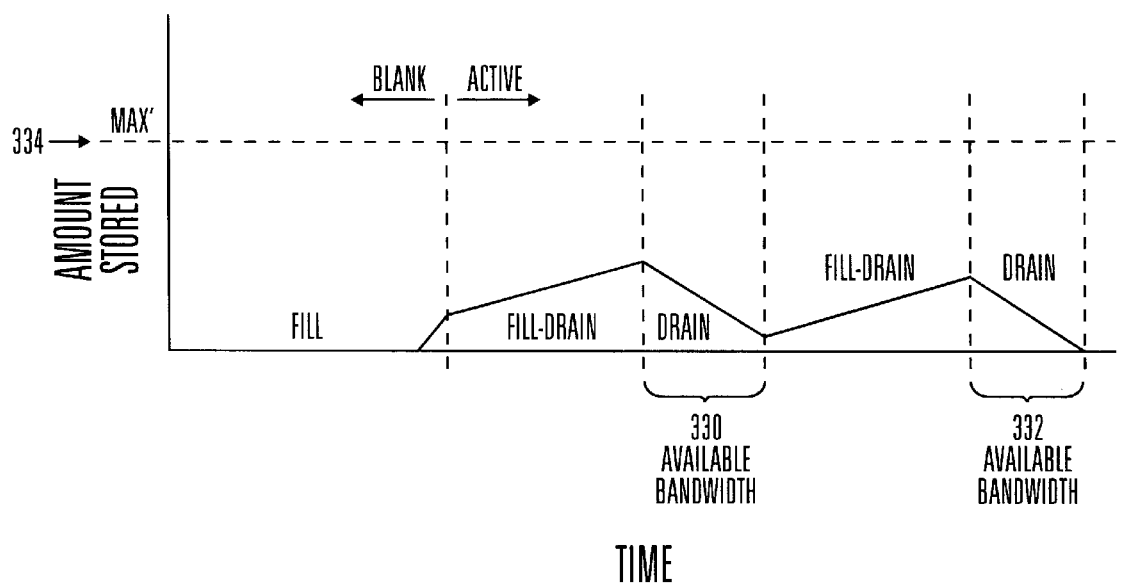
FIG. 3D illustrates alternative fill and drain rates that may be used in an embodiment of the present invention.

The capacity required for graphics FIFO 130 is determined by the fill rate end the period of time that the graphics FIFO is filled during the blank interval 302. The drain rate is determined by the pixel clock. The capacity required for graphics FIFO 130 can be reduced by reducing the data transfer rate (the fill rate) on serial bus 118 which also reduces the bandwidth of serial bus 118. In this manner, bandwidth may be traded to reduce the required memory capacity. Alternatively, graphics information may be sent periodically in small packets. The graphics FIFO 130 storage profile for such an approach is shown in FIG. 3D. During periods when graphics information is not being sent across serial bus 118 (as indicated at 330 and 332), packets of other types may be sent across serial bus 118. By sending the graphics information intermittently, the capacity required for graphics FIFO 130 can be reduced from the amount indicated at 320 (max) in FIG. 3C to the amount indicated at 334 (max') in FIG. 3D.

Thus, the fill rate and the order and size of packets transferred across serial bus 118 can be controlled to manage FIFO capacity. These techniques may be applied to different packet types selectively to provide for different FIFO lengths while using bandwidth efficiently. For instance, in more advanced embodiments, color palette information and control register values may be sent to a control FIFO in a PACDAC and unloaded during the vertical blanking interval. Since the vertical blanking interval is relatively long, the data transfer rate for the control information can be reduced to allow a small FIFO to be used.

In the exemplary embodiment, the order that packets are sent to PACDAC 120 and the transfer rate for different packet types can be flexibly controlled by software on a frame-by-frame basis, the control information for a frame of display data is stored by the software in a master control structure 116a or 116b in the display memory 106. Two master control structures 116a and 116b are used in the exemplary embodiment, so one of the master control structures may be updated while controller 102 uses the information in the other master control structure. At the end of each frame of display data, controller 102 may toggle to the other master control structure for the next frame. This double-buffering allows software to modify control information seamlessly without interrupting the ongoing of display of graphics and video information.

FIG. 4 illustrates the format of an exemplary master control structure 400. The first field 402 ("PKT-ORDR") contains packet ordering information which determines the order that packets are sent to PACDAC 120 for each horizontal scan line. In the exemplary embodiment, the same packet order is used for each line of a frame although the packet order may change from frame to frame. The number of bits required for field 402 depends on the number of different packet types that are supported by the system.

The next five fields 404 to 412 indicate the location and format of the graphics information in portion 112 of display memory 106. Field 404 ("GD_PTR") points to the location of the first dword of graphics data for the current frame (e.g., the starting address of the graphics portion 112 of display memory 106). Field 406 ("GD_Y_END") contains the position of the last screen row of display graphics pixels plus one. Field 408 ("GD_Y_STRT") contains the screen row of the first line of graphics pixels to be displayed. The row position values may be based on a arbitrary reference point, usually line zero. Typically line zero represents the first scan line of the VSYNC period for the frame and GD_Y_END and GD_Y_STRT are measured as row offsets from this line.

Fields 410 and 412 contain values which constrain the horizontal boundaries for the graphics data in units measured in dwords. Field 410 ("GD_PTCH") indicates the pitch of the graphics data in display memory 106. Pitch is the difference between the addresses of two vertically adjacent pixels, in dwords. Field 412 ("GD_X_CNT") indicates the number of dwords contained in a single line of graphics data. Commonly GD_PICH and GD_X_CNT will contain the same value if graphics data is packed without gaps between the last pixel of line N and the first pixel of line N+1. Fields 404 to 412 are used by controller 102 to determine the addresses of the graphics data in display memory 106 to be sent to PACDAC 120 for each horizontal scan line.

Fields 414 to 422 indicate the location and format of the video information in portion 110 of display memory 106. Fields 414 to 410 ("V_PNTR," "V_Y_END," "V_Y_STRT," "V_PTCH," AND "V_X_CNT") indicate the location, ending row, starting row, pitch and dwords per screen row for the video data in the same manner as fields 404 to 412 do for the graphics data.

An additional field 424 ("V_Y_SINC") is provided for video data which indicates a value to use for up scaling. In the exemplary embodiment, up scaling is performed by sending the same line of video data to PACDAC 120 for more than one horizontal scan line (referred to as upscale with repetition). More advanced embodiments (described below) may also support up scaling using interpolation. Replication up scaling is performed based on the value of V_Y_SINC. Controller 102 up scales using a 12+1 bit digital differential analyzer (essentially a 12 bit adder with a 1 bit carry). After each line of video data is sent to PACDAC 120 the V_Y_SINC value is added to the DDA and the controller checks for overflow. If overflow occurs, the video pitch V_PTCH is added to a pointer (maintained in controller 102) that is used to send lines of video data to PACDAC 120, so the next line of data will be sent for the next horizontal scan line. If overflow does not occur, the pointer is unchanged. This technique is used because the DDA is already provided in controller 102 for controlling the graphics data transfer rate across serial bus 118 as described further below.

The next two fields 426–428 ("TS_PNTR," and "TS_LENG") provide information related to timing for the frame. Field 426 ("TS_PTR") contains a pointer to a timing structure in portion 114 of display memory 106. The timing structure indicates the timing atoms that should be sent to PACDAC 120 for each horizontal scan line of the frame. Field 428 ("TS_LENG") contains the total number of different timing atoms for the frame.

Figure 5:
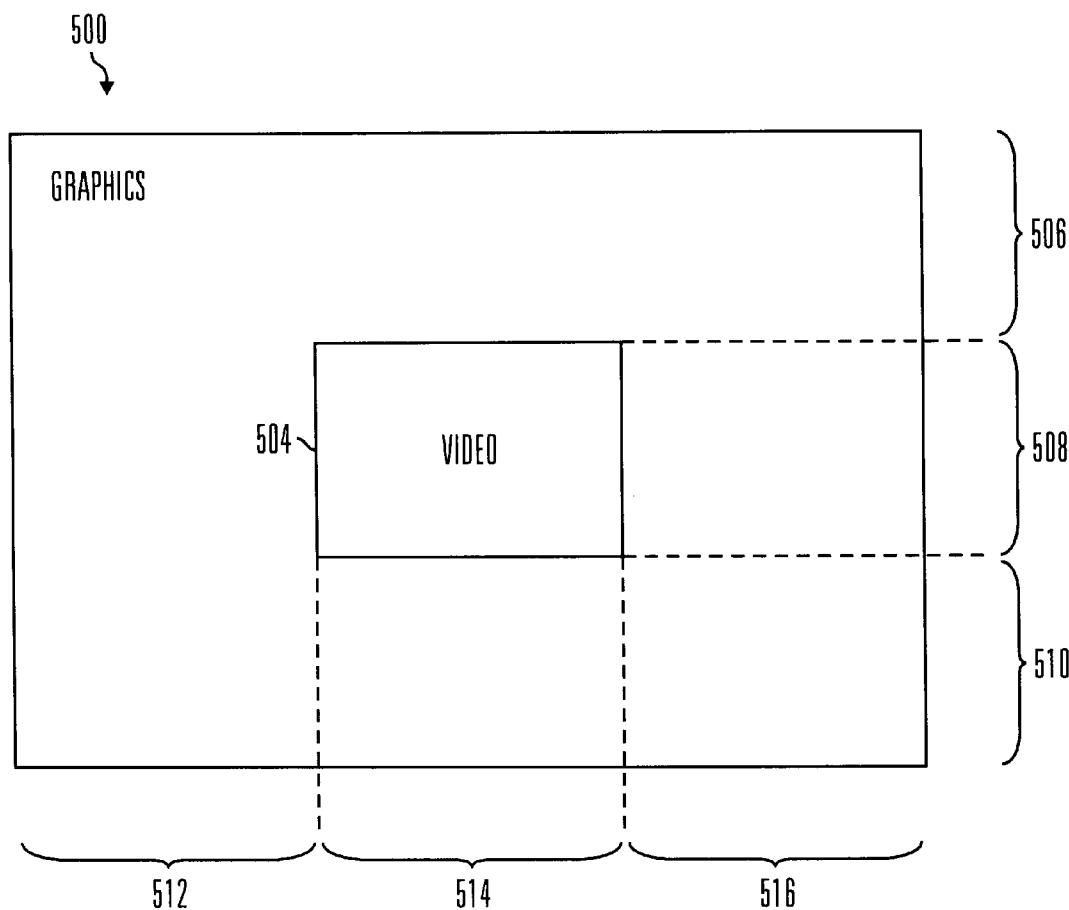
FIG. 5 illustrates a sample display screen format.

FIG. 5 illustrates how the timing structure and timing atoms represent a screen of display data in system 100. A display screen, generally indicated at 500, includes graphics and video in a video window 504. The display screen may be divided into three vertical portions 506, 508, and 510. Within each vertical portion, the format of the horizontal lines is the same. In vertical portion 506, the horizontal lines comprise only graphics information. Each line of active display data requires only a single timing atom that selects the graphics information for display. Of course, other timing atoms are used to generate control signals such as HSYNC, VSYNC, Blank, and linesync for each line. In vertical portion 508, the horizontal lines comprise graphics and video information as indicated by segments 512, 514 and 516. Segments 512 and 516 contain graphics information and segment 514 contains video information. Each line of active display data in portion 508 requires three timing atoms—a first timing atom selecting graphics for the pixels in segment 512, a second timing atom selecting video for the pixels in segment 514, and a third timing atom selecting graphics for segment 516. Of course, additional timing atoms are used to generate appropriate control signals. In vertical portion 510, as in portion 506, only graphics information is displayed and only one timing atom is required for each line of active display data. Of course, it will be readily apparent that the screen format shown in FIG. 5 is illustrative and any variety of screen formats may be supported. As described below, software can flexibly determine the format for each screen by loading appropriate timing information into display memory 106.

Figure 6:
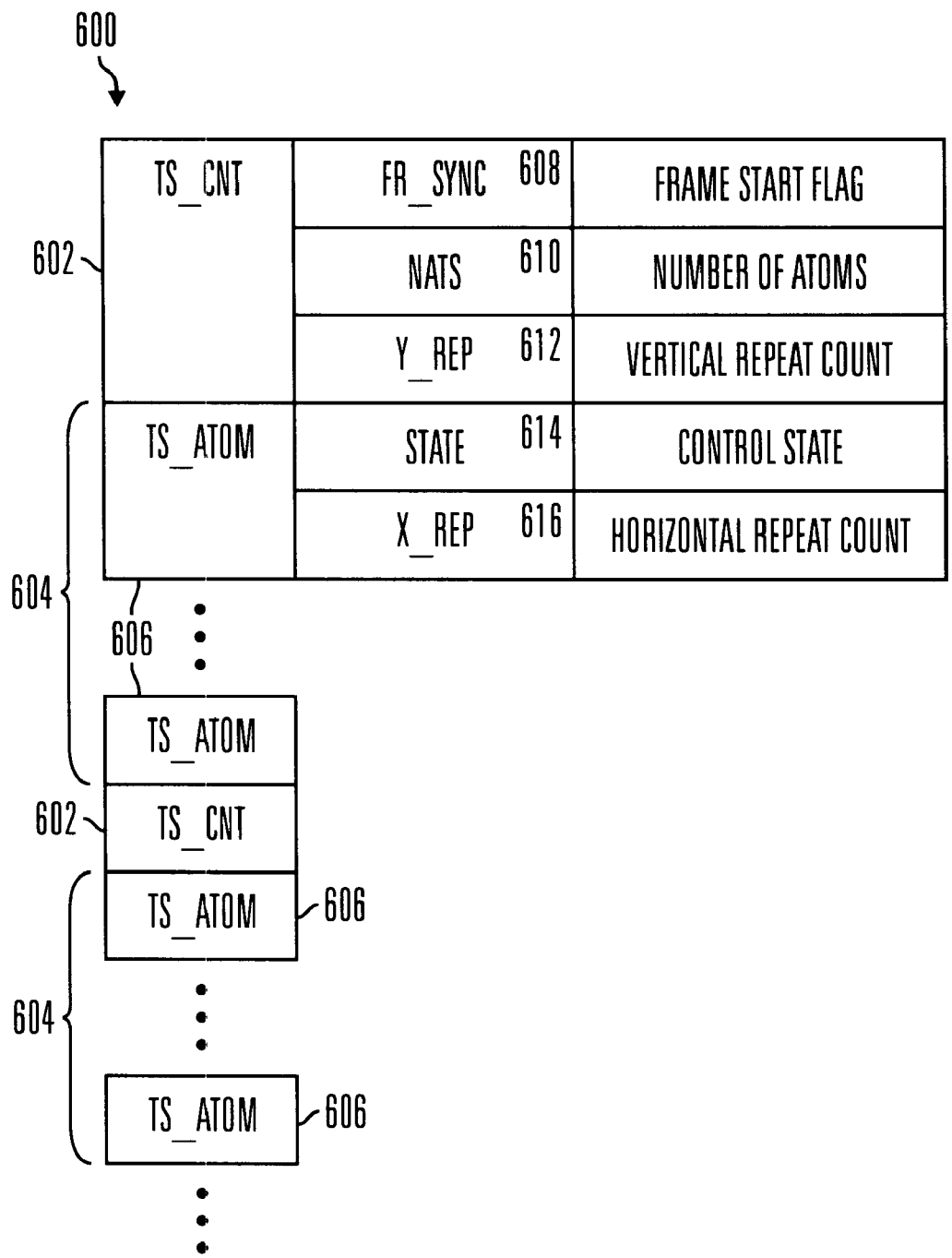
FIG. 6 shows the format of a timing structure used in the exemplary embodiment of FIG. 1.

The timing structure referenced by field 426 ("TS_PTR") of master control structure 400 indicates the desired screen format. FIG. 6 shows the format of an exemplary timing structure, generally indicated at 600, used in system 100. The timing structure 600 comprises a timing count record 602 ("TS_CNT") followed by a set 604 of timing atoms 606 ("TS_ATOM"). A separate TS_CNT and set of timing atoms is provided for each vertical portion of the frame (such as portions 506, 508 and 510 in FIG. 5). The set of timing atoms includes timing atoms that are repeated for each horizontal scan line of the vertical portion.

A set of timing atoms only includes the timing atoms required for a single line, since all the lines in the corresponding vertical portion of the display screen share the same format. Thus, for the illustrative screen format shown in FIG. 6 three timing count records 602 and corresponding sets of timing atoms 604 would be required for the active display data. A separate timing count record and set of timing atoms would be required for the vertical blanking interval (not shown in FIG. 5).

The timing count records 602 include three fields 608, 610 and 612. Field 608 ("NATS") indicates the number of timing atoms in the set corresponding to the timing count record 602. Field 612 ("Y_REP") is a count that indicates the number of times the set of timing atoms should be repeated. The Y_REP count corresponds to the number of lines in the corresponding vertical portion of the display screen. Each timing atom 606 contains a field 614 ("X_REP") indicating the duration (i.e., number of pixel clock cycles) to assert the state indicated by a state field 614 as described in greater detail above with reference to FIG. 2B.

The timing count records 602 are used by the controller 102 to vertically run length encode the format information for a frame of display data. The set of timing atoms is stored only once for multiple lines of display data. Controller 102 sends the same set of timing atoms from display memory 106 to PACDAC 120 for the number of lines indicated by the Y_REP field 612 in the current timing count record. Controller 102 then moves on to the next timing count record and processes subsequent lines of display data accordingly. The timing atoms, on the other hand, are used by PACDAC 120 to horizontally run length encode the format information for a horizontal scan line. A given signal is asserted by the timing state machine in PACDAC 120 and held for the duration indicated by the timing atom.

Referring to FIG. 4, the last field 430 ("CLK_MOD") of master control structure 400 is used to adjust the data transfer rate of graphics packets across serial bus 118. As described above, the data transfer rate may be adjusted to allow a smaller graphics FIFO to be used in PACDAC 120. The CLK_MOD field 430 allows the data transfer rate for graphics packets to be modified from frame to frame without affecting the data transfer rate for packets of other types. The value in the CLK_MOD field 430 is a twelve bit value in the exemplary embodiment indicating periodic clock cycles that should be blocked by controller 102 when it generates the serial clock signal on line 124. This prevents the transfer of data during the blocked clock cycles and reduces the overall effective data transfer rate.

Figure 7:
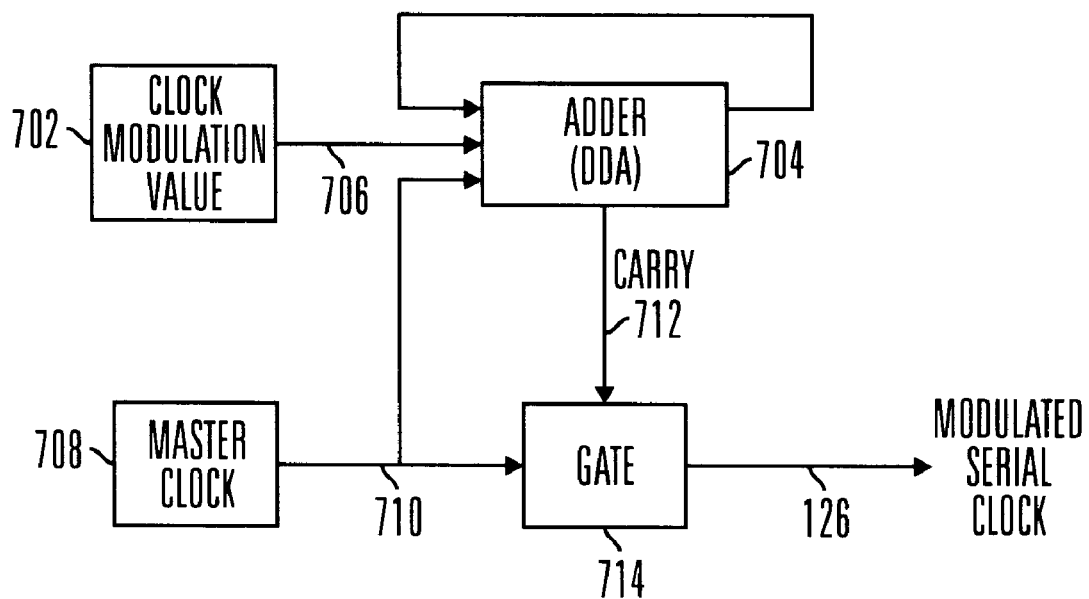
FIG. 7 is a block diagram of a circuit for modulating a clock signal according to the exemplary embodiment of FIG. 1.

FIG. 7 shows a circuit that may be used by controller 102 to generate the serial clock for transferring graphics data. The clock modulation value ("CLK_MOD") is stored in a register 702 and is provided to a 12+1 bit DDA 704 (essentially a twelve bit adder with a one bit carry value) over line 706. A master clock 708 also provides a clock signal to DDA 704 over line 710. The DDA 704 increments the twelve bit value in the adder by the clock modulation value on each master clock cycle. If this incrementing causes the twelve bit DDA value to overflow, a carry signal is asserted on line 712 for that clock cycle. The carry signal on line 712 and the master clock signal on line 710 are provided to a gate 714. When the carry signal is not asserted, the gate passes the master clock signal unmodified to line 126 as the serial cock. When the carry signal is asserted on line 712, the master clock signal is blocked by gate 714. Thus, cycles may be dropped from the serial clock at a frequency determined by the clock modulation value.

In the exemplary embodiment, the serial clock is modulated only for graphics packets, since the graphics FIFO 130 in PACDAC 120 is less than a horizontal line of graphics pixels long. Other packet types are transferred across serial bus 118 at the maximum rate provided by the master clock signal. In contrast, if the master clock frequency were altered from frame to frame the data transfer rates for all packets would be affected. Furthermore, changing clock frequencies typically requires a set up time spanning several frames while the clock modulation value of the exemplary embodiment may be flexibly determined by software for each frame. Thus, the data transfer rate may be selectively modified from frame to frame for selected data types.

In alternative embodiments, packet ordering and clock modulation control information may be provided more frequently than on a frame by frame basis. A packet ordering field and/or a clock modulation field could be included in each timing count record. As a result, the order that packets are sent across serial bus 118 and the data transfer rate for selected packet types could be modified for each vertical portion of a frame, such as portions 506, 508, and 510 of FIG. 5. Such an approach would provide even more flexible software management of the bandwidth on serial bus 118 and capacity of FIFOs 128–132. The packet ordering and data transfer rate may be changed as often as every line in some embodiments.

In the exemplary embodiment, all of the packets of a given type (i.e., video, graphics or timing information) for a horizontal scan line are sent to PACDAC 120 before the next type of packet for that scan line is sent. Alternative embodiments may allow a given type of data for a horizontal scan line to be sent in smaller groups interleaved with data of other types. For instance, half of the graphics packets for a line may be transferred, followed by video and/or timing packets. Then, after the video and/or timing packets have been sent, the second half of the graphics packets for the line may be sent. Such techniques can be used to manage the capacity of selected FIFOs as shown in FIG. 3D. One way of implementing the above technique is to associate a count with the packet types in the packet ordering field of the master control structure. The count would indicate the amount of data to transfer of the given packet type, and the same packet type could be repeated at different locations within the packet order. The sum of all the counts for a given packet type would add up to the amount of data of that type required for the line. A variety of other implementations will be readily apparent to those of ordinary skill in the art. Such a packet ordering field could also be included in the timing count record of the timing structure to allow different packet orders within a frame.

The above aspects of the present invention allow the vertical and horizontal format of display information to be flexibly controlled by software. The format may be modified on a frame by frame basis using double buffered master control structures in display memory 106. In addition, bandwidth efficiency and FIFO capacity may be carefully managed by software by controlling the order and data transfer rate of packets across serial bus 118. In particular, different data transfer frequencies may be used for different packet types and these frequencies may be modified on a frame by frame basis, and in some embodiments on a line by line basis. Importantly, the data transfer rate may be modified without generating a different master clock. Rather, clock cycles may be periodically blocked to adjust the data transfer rate.

The above aspects of the present invention may be advantageously incorporated into a multimedia system that seamlessly blends computer graphics, sound and full motion video. Conventionally, providing full multimedia capability in a personal computer has been a piecemeal affair, characterized by independent graphics, audio, and video solutions from multiple vendors. This has resulted in duplicated hardware, non-optimized bus systems, wasted memory space and bandwidth, and a multitude of vendors for a single implementation. The above described packet based architecture with flexible software control allows a complete multimedia solution to be provided using a single family of highly integrated multimedia components. A single bus connection with a single interrupt line may be used and a variety of hardware components including memory and data transfer buses may be shared by the different media components to reduce memory requirements and increase bandwidth.

Figure 8:
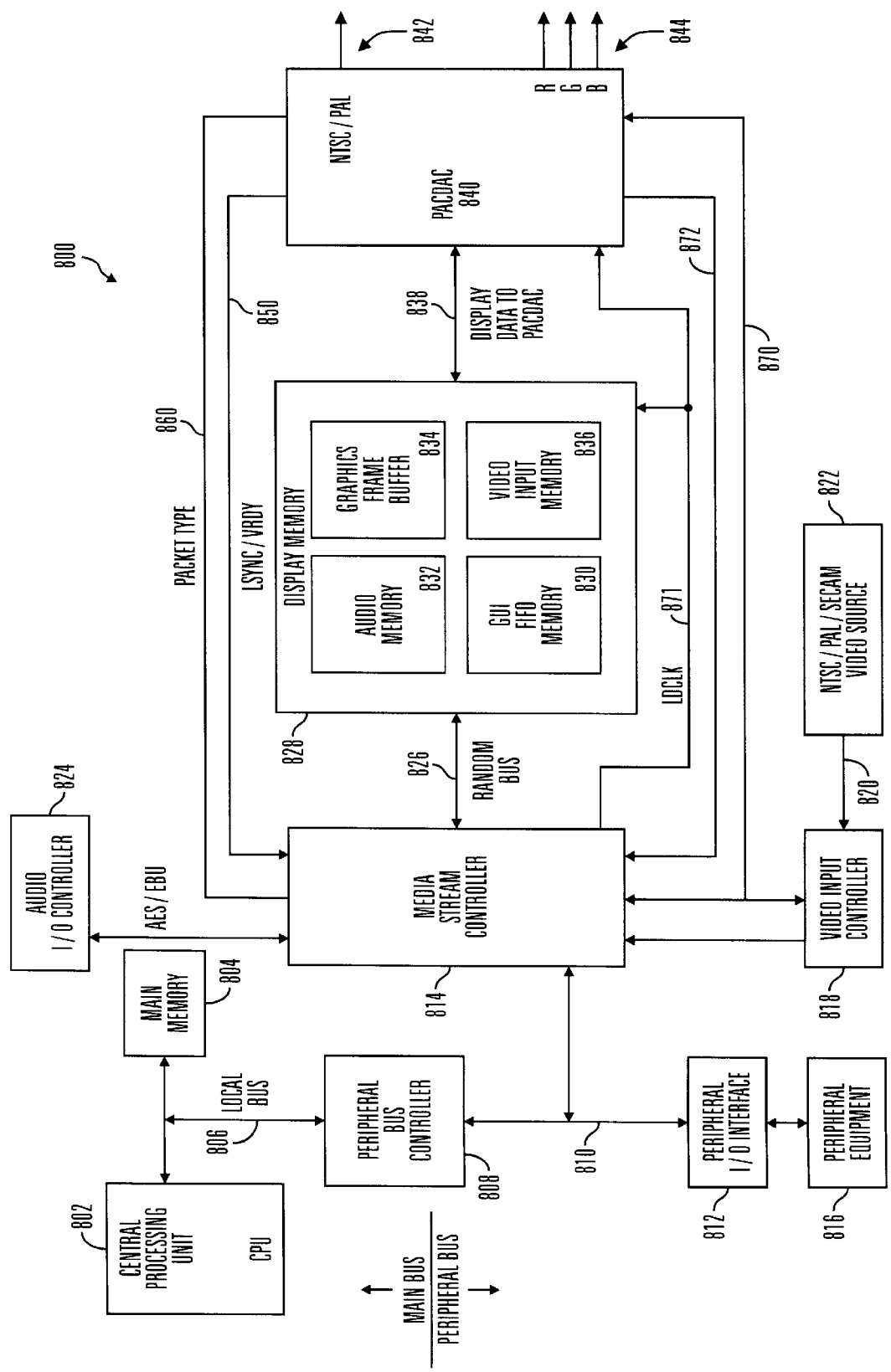
FIG. 8 is a block diagram illustrating a system according to an alternative embodiment of the present invention for multimedia processing in a personal computer.

FIG. 8 is a simplified block diagram illustrating such a system, generally indicated at 800, for multimedia processing in a personal computer according to an alternative embodiment of the present invention. Referring to FIG. 8, this system includes a central processing unit (CPU) 802 and a main memory 804 for storing both executable instructions and data for the system. In the system of FIG. 8, the CPU 802 and the main memory 804 are connected to a local bus 806. The system 800 shown in FIG. 8 also includes peripheral bus controller 808 connected to the local bus 806. Preferably, in the first embodiment, the peripheral bus controller 808 provides a PCI bus system although other bus systems may be supported. A peripheral bus 810 has a common connection with the peripheral bus controller 808, with a peripheral I/O interface 812 and with media stream controller 814. While the peripheral bus 810 is coupled to the local bus using peripheral bus controller 808 in the first embodiment, other embodiments of the present invention may be adapted to support other methods of connecting to the local bus, such as direct connection, buffered connection or connection through a combined cache/bridge. See Tom Shanley and Don Anderson, *PCI System Architecture*, PC System Architecture Series Volume 4 at 12–30 (MindShare Press 2nd ed. 1994), which is hereby specifically incorporated herein by reference.

Referring to FIG. 8, the peripheral I/O interface 812 is connected to peripheral equipment 816. The peripheral bus 810 in the first embodiment may be a PCI bus which provides a data bandwidth of thirty two (32) bits in parallel and which may in the future provide as many as sixty four (64) bits in parallel. The peripheral equipment 816 may illustratively be a printer or disk drive which is operated in accordance with commands from the CPU 102. One of ordinary skill in the art will appreciate the interconnection and operation of these components.

Figure 9:
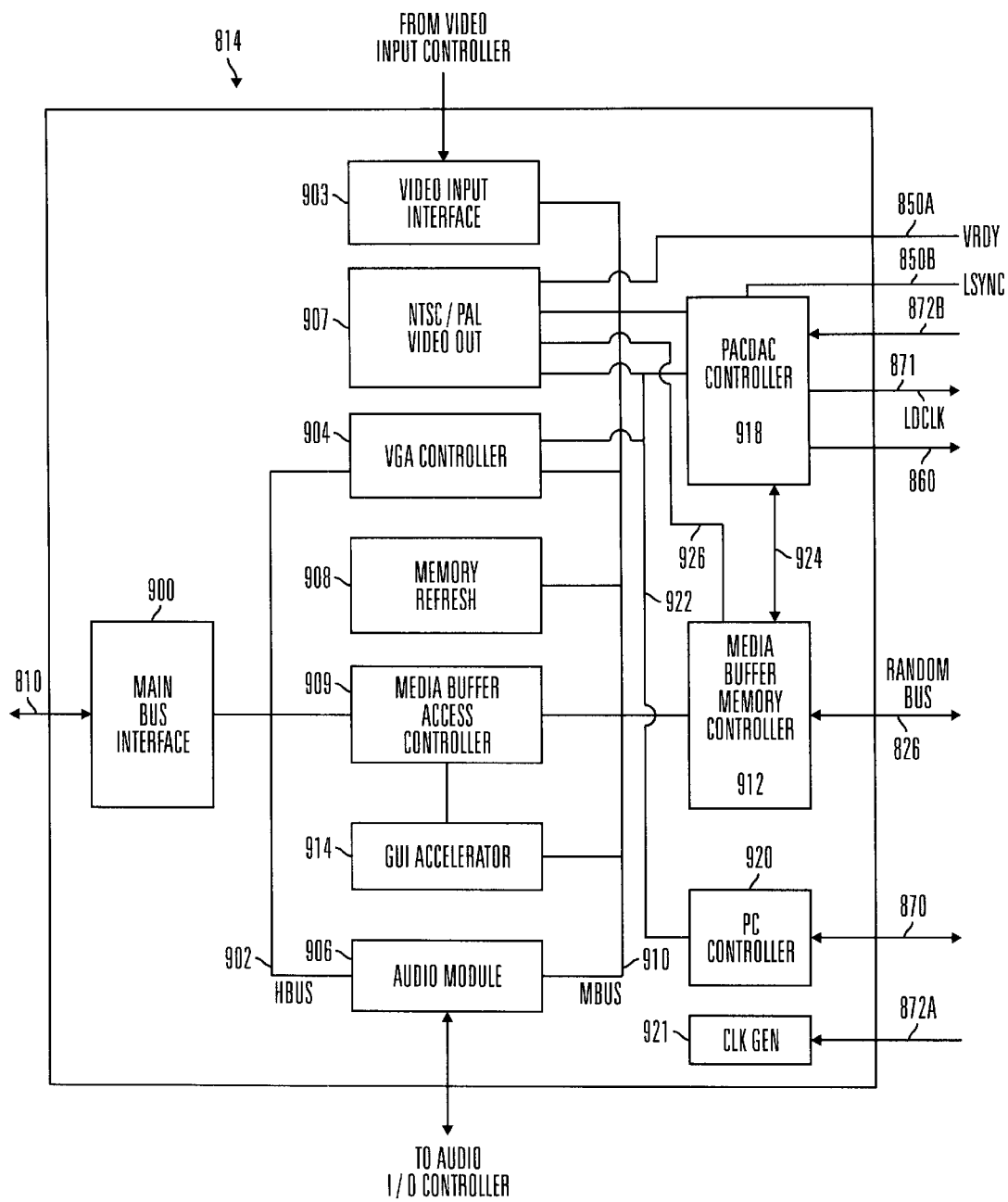
FIG. 9 is a block diagram showing in additional detail portions of one of the blocks shown in FIG. 8, this block being designated as "Media Stream Controller" in FIG. 8.

The peripheral bus 810 shown in FIG. 8 is coupled to a media stream controller 814 shown as a single block in FIG. 8 and as a simplified block diagram in FIG. 9. The media stream controller 814 may be disposed on an integrated circuit chip. The media stream controller 814 controls processing for various types of media. An exemplary media stream controller is the BtV2115 integrated circuit chip from Brooktree Corporation, the technical specification of which is attached hereto as Appendix A (included in application but not printed with patent) and is hereby incorporated herein by reference.

Referring to FIG. 8, the media stream controller 814 receives inputs from a video input controller 818. The video input controller 818 receives video inputs through a bus 820 from a video source 822 which may be constructed in a conventional manner. The media stream controller 814 also receives inputs from, and provides outputs to, an audio I/O controller 824 which may be constructed in a conventional manner. The audio I/O controller 824 may provide sound output to speakers or some other sound output device (not shown) or receive inputs from a speaker or other sound input device (not shown). Preferably, a standard AES/EBU serial audio interface is used for communication between the media stream controller 814 and audio I/O controller 824. The audio subsystem and related portions of system 100 are described in further detail in co-pending application Ser. No. 08/337,924 (attorney's file 11543-701) filed on Nov. 10, 1994 in the names of Paul B. Wood and Marc M. Stimak as joint inventors, titled "System and Method for Command Processing and Data Transfer in a Computer System for Sound or the Like" (now U.S. Pat. No. 5,732,279), and which is hereby incorporated herein by reference.

A random bus 826 is common with the media stream controller 814 and a display memory 828. Preferably, random bus 826 allows for a high rate of data transfer between the media stream controller 814 and the display memory 828. In the first embodiment, random bus 826 supports a data transfer rate of approximately 100 megabytes/second (100 Mbs) and includes a thirty two (32) bit wide data bus.

The display memory 828 has different portions for storing data and control information related to various media subsystems. For example, the display memory 828 has a portion 830 designated as a "GUI FIFO memory" for storing commands on an overflow basis. The GUI FIFO memory portion 830 and related portions of the system are disclosed in detail in co-pending application Ser. No. 08/337,939 (attorney's file D-2793) filed on Nov. 10, 1994 in the names of David C. Baker and Michael D. Asal as joint inventors, titled "System for, and Method of, Processing in Hardware Commands Received from Software without Polling of the Hardware by the Software" (now U.S. Pat. No. 5,715,437), and which is hereby incorporated herein by reference. The display memory 828 also has an audio memory portion 832 for storing information related to digital sound I/O. The audio memory 832 is described in further detail in co-pending application Ser. No. 08/337,924 (attorney's file 11543-701) filed on Nov. 10, 1994 in the names of Paul B. Wood and Marc M. Stimak as joint inventors, assigned of record to the assignee of record of this application, titled "System and Method for Command Processing and Data Transfer in a Computer System for Sound or the Like" (now U.S. Pat. No. 5,732,279), which is hereby incorporated herein by reference. The display memory 828 also includes a graphics frame buffer memory 834 for storing graphics data, such as data for a color look-up table, and a video input memory 836 for storing video data. A system for storing graphics data and video data in different portions of a display memory is disclosed in detail and claimed in U.S. Pat. No. 5,406,306 which is hereby incorporated herein by reference. The display memory 828 may also include a video output memory (not shown) for storing composite video data to be output to an NTSC or PAL video device. A system for generating NTSC and PAL video signals is described in further detail in co-pending application Ser. No. 08/337,350 (attorney's file 11543-702) filed on Nov. 10, 1994 in the names of David C. Baker, Daniel P. Mulligan, and Eric J. Schell as joint inventors, titled "System and Method for Generating Video in a Computer System", (abandoned in favor of continuation application Ser. No. 08/783,777, now U.S. Pat. No. 5,790,110 which is hereby incorporated herein by reference. It will be recognized that not all portions of the display memory 828 need be active or resident at the same time.

The embodiment shown in FIG. 8 includes a display memory 828 that comprises a video random access memory (VRAM). The VRAM provides an array of dynamic memory cells that may be accessed through either conventional DRAM control signals or through a serial access memory (SAM). A SAM is essentially a long shift register that receives a block of data from the dynamic memory array and shifts the data out of the VRAM serially through a serial port. Using video random access memory for display memory 828 has certain advantages because it provides a SAM with a relatively high serial output clock speed. However, as will be readily apparent to those of ordinary skill in the art, other types of memories can be used without departing from the scope of the present invention. These include, without limitation, a high speed dynamic random access memory (DRAM) and a synchronous dynamic random access memory (SDRAM).

The outputs from the graphics frame buffer memory 834 and the video input memory 836 may be provided on a serial bus 838 designated as "Display Data to PACDAC" in FIG. 8. The output on serial bus 838 is provided to PACDAC 840 and may include both data and control information from display memory 828. The term "PACDAC" refers to a packet based digital-to-analog converter (DAC). An exemplary PACDAC is the BtV2487 integrated circuit chip from Brooktree Corporation, the technical specification of which is attached hereto as Appendix A (included in application but not printed with patent) and is hereby incorporated herein by reference. A PACDAC and related portions of the system are also described in detail and claimed in co-pending application Ser. No. 08/214,787 filed Mar. 16, 1994 (attorney's file D-2717), in the names of David C. Baker and Jonathan I. Siann, titled "Multimedia Graphics System", (now U.S. Pat. No. 5,640,332) which is hereby incorporated herein by reference. The PACDAC uses a first-in/first-out buffer (FIFO) to buffer video, graphics, cursor, or control related packets received from display memory 828. The video or graphics related packets may be converted to analog form and output to a video or graphics device. Preferably line 838 allows for a high rate of data transfer between display memory 828 and PACDAC 840. In the first embodiment, line 838 supports a data transfer rate of approximately two hundred megabytes/second (200 Mbs) and includes a thirty two (32) bit wide data bus.

In addition to receiving data and control information across line 838, PACDAC 840 receives control information from media stream controller 814 across line 860, also designated as "Packet Type" in FIG. 8. This control information indicates the type of packet (video, graphics, control information etc.) that is being sent to the PACDAC 840 at any given time. A load clock ("LCLK") is also provided by media stream controller 814 to PACDAC 840 as well as to display memory 828 on line 871. LCLK controls the transfer of data across serial bus 838. PACDAC 840 also provides certain information to media stream controller 814. The PACDAC provides a linesync signal ("LSYNC") and video ready signal ("VRDY") to the media stream controller 814 across lines 850, also designated as "LSYNC/VRDY" in FIG. 8. The linesync signal indicates to the media stream controller 814 that PACDAC 840 is ready to receive additional data for display from display memory 828. When system 800 is generating composite video, the video ready signal indicates that PACDAC 840 is ready to receive additional composite video data. The PACDAC 840 also provides media stream controller 814 with certain status information across a bus 870, which is preferably a standard $I^2C$ bus.

Clocking information may also be generated in the PACDAC 840 of the first embodiment. In the first embodiment, clock signals having frequencies of approximately 16.9344 Megahertz (MHz) and 24.576 MHz are generated. These clock signals may be provided to the media stream controller 814 across lines 872. The 24.576 MHz clock signal may be divided in half by a clock generator ("CLKGEN") media stream controller 814 (shown in FIG. 9) to produce a 12.288 MHz clock signal. This provides a 12.288 MHz clock signal in addition to the 16.9344 MHz clock signal. Both the 12.288 MHz and 16.9344 MHz clock signals are used for audio processing in the first embodiment. The 24.576 MHz clock signal may also be doubled by clock generator 921 (to almost 50 MHz) or quadrupled (to almost 100 MHz) to provide for high speed clocking inside the media stream controller 814. The 16.9344 MHz and 24.576 MHz clock signals are also used in PACDAC 840 to control video and graphics processing.

The PACDAC 840 of the first embodiment uses a FIFO and DAC to generate an analog composite video signal from data stored in the display memory 828. The composite video signal of the first embodiment may be provided to a video device, such as a VCR, NTSC/PAL monitor, or the like, through the NTSC/PAL port 842. In addition, the PACDAC may have a random access memory (RAM) and additional digital-to-analog converters for graphics. For graphics, the binary information in the graphics frame buffer memory 834 may represent positions in a RAM look-up table and these positions may have binary indications representing pseudo colors. These binary indications are converted to analog values by digital-to-analog converters to provide the colors at the different pixel positions on a graphics display monitor through ports 844 labeled RGB. As disclosed in U.S. Pat. No. 5,406,306, video information from video input memory 836 may also be converted to a form compatible with the graphics information for the graphics frame buffer memory 834 and this converted video information may be shown in a display monitor through ports 844.

The primary coordination among the various media components of the first embodiment is provided by media stream controller 814. Portions of media stream controller 814 are shown in additional detail in FIG. 9. Referring to FIG. 9, the media stream controller 814 communicates with the peripheral bus 810 through a main bus interface 900. The main bus interface 900 is connected to an internal 3-state Hbus 902 allowing communication with various functional modules attached to the Hbus. These modules may include, among other things, a video input interface 903 for receiving video data, a VGA controller 904 for graphics, an audio module 906 for sound, an NTSC/PAL video out module 907 for outputting video data, a memory refresh module 908 for controlling the refresh of the display memory 828, and a media buffer access controller 909 which may allow data to pass through the media stream controller to the display memory via an Mbus 910 and media buffer memory controller 912. Aspects of the video input interface 903 and related portions of the system are described in additional detail in co-pending application Ser. No. 08/537,491 filed Oct. 2, 1995 (attorney's file 11543.704), in the names of Stephen G. Glennon, Daniel P. Mulligan and Paul B. Wood, titled "System and Method for Selectively Processing Video," now U.S. Pat. No. 5,805,173 which is hereby incorporated herein by reference. Aspects of the media buffer access controller 909 and related portions of the system are described in additional detail in co-pending provisional application Ser. No. 60/004,756 filed Oct. 2, 1995 (attorney's file 11543.705), in the names of Steven B. Ehlers and Michael D. Asal, titled "Apparatus and Methods for Automatically Controlling Block Writes," converted to utility application 08/543,236 on Oct. 13, 1995, now U.S. Pat. No. 5,717, 904 which is hereby incorporated herein by reference. A GUI accelerator 914 may also be provided as shown. Other modules such as flash ROM or Yamaha OPL support may also be added to the Hbus.

Each of these modules is connected to an internal Mbus 910 which provides communication with media buffer memory controller 912. The media buffer memory controller 912 is a memory controller for display memory 828, and communicates with the display memory across random bus 826. Each of the modules may transfer packets of data to and/or from the display memory via Mbus 910, media buffer memory controller 912, and random bus 826.

A PACDAC controller 918 is also provided in the media stream controller 814. The PACDAC controller provides control information to PACDAC 840. The PACDAC controller 918 is connected to Mbus 910 and may transfer packets of PACDAC control data to media buffer memory controller 912 over Mbus 910. In addition, the PACDAC controller 918 may send other PACDAC control information to media buffer access controller 912 across line 924. Control information for the PACDAC may then be sent through the display memory 828 to the PACDAC 840. The PACDAC controller 918 also provides signals to PACDAC 840 on line 860, also designated as "Packet Type" in FIG. 8, which indicate whether a packet received by the PACDAC 840 from the display memory 828 contains control information or video or graphics related information.

The VGA controller 904, NTSC/PAL video out 907, PACDAC controller 918, and an I²C controller 920 are connected to, and may communicate across bus 922. The media stream controller 814 may communicate with other portions of the multimedia system of the first embodiment through the video input interface 903, audio module 906, media buffer memory controller 912, PACDAC controller 918, and I²C interface 920. Preferably, standard interfaces such as AES/EBU and I²C are supported.

PACDAC controller 918 receives a linesync signal from PACDAC 840 on line 850*b* (a portion of lines 850 shown in FIG. 8) and a serial clock on line 872*b* (a portion of lines 872 shown in FIG. 8). PACDAC controller 918, in turn, generates the LDCLK signal on line 871. The VRDY portion of lines 850 is provided to NTSC/PAL video out module 907 on line 850*a* and clocking information from lines 872 is provided to a clock generation ("CLK_GEN") on line 872*a*.

The NTSC/PAL video out module 907 may receive a video ready signal from PACDAC 840 over line 850*a*. A signal on line 850*a* indicates that the PACDAC 840 is ready to receive packet(s) of digital composite video data which are converted by the PACDAC 840 to produce an analog composite video signal. When the NTSC/PAL video out module receives a video ready signal, it sends a request to the media buffer memory controller 912 or lines 926. The media buffer memory controller 912 then causes the requested packet of digital composite video data to be transferred to the PACDAC from display memory 828. Once the request from the NTSC/PAL video out module 907 has been serviced, the media buffer memory controller sends an acknowledged signal to the NTSC/PAL video out module 907 over lines 926. The NTSC/PAL video out module 907 will not send additional video related packets in response to a video ready signal until the acknowledgment signal has been received. This allows the PACDAC 840 to receive the first packet and to deassert the video ready signal if necessary to prevent additional packets from being sent by the NTSC/PAL video out module 907.

It will be apparent to those of ordinary skill in the art that the system described above provides an architecture that allows hardware components—including without limitation the main bus interface 900, display memory 828, and PACDAC 840—to be shared by multiple media subsystems. It should be noted that, traditionally, graphics, video, and audio subsystems have used separate memory spaces and bus connections as a result of independent controllers with incompatible data types. This may result in wasted memory space and memory bandwidth, duplicated bus interface logic, and wasted CPU cycles to manage independent subsystems. As a consequence, the cost of providing these capabilities has been relatively high. It is an advantage of the system of system 800 that components may be shared and that the cost and complexity of the overall multimedia solution is reduced.

Figure 10:
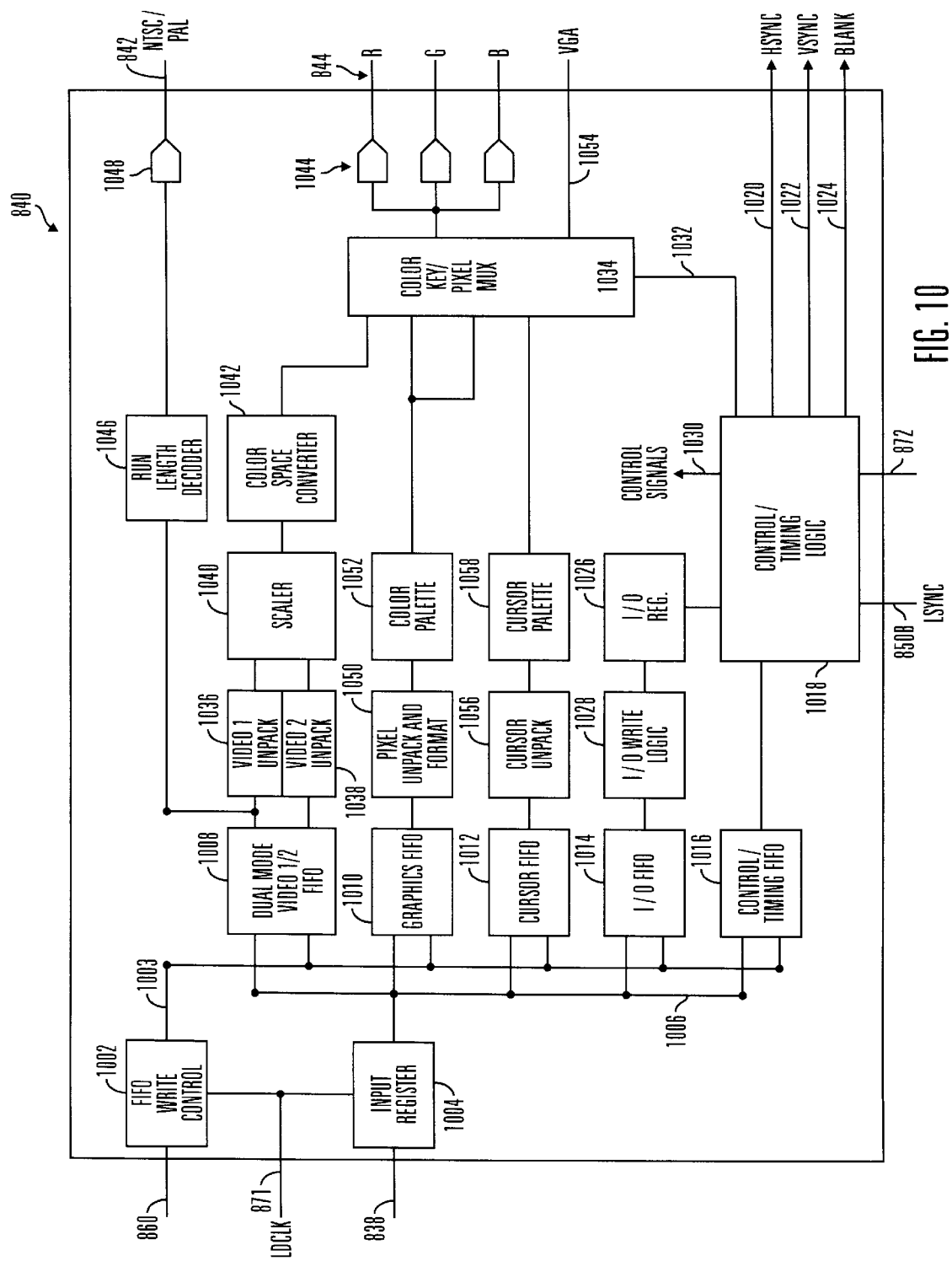
FIG. 10 is a block diagram showing in additional detail portions of one of the blocks shown in FIG. 8, this block being designated as "PACDAC" in FIG. 8.

The operation of PACDAC 840 will now be described with reference to FIG. 10. As with PACDAC 120 of FIG. 1, multimedia data may be received in packets and buffered in corresponding FIFOs. PACDAC 840, however, supports additional packet types and advanced multimedia processing. The packet types include graphics pixels, video pixels for a first video window ("Video 1"), video pixels for a second video window ("Video 2"), cursor pixels, timing structures, and I/O write values. (See Table 1 in Appendix A)

(included in application but not printed with patent) An I/O write packet is used to update the values of internal registers in PACDAC 840 (see Table 2 in Appendix A (included in application but not printed with patent). The internal registers are used to control such things as cursor position, cursor color, color keying, etc. The addresses and functions of the internal registers are shown in Appendix A (included in application but not printed with patent).

As with system 100, a packet type signal (line 860) and LDCLK (line 871) are received by FIFO write control logic 1002 which determines which FIFO should receive the corresponding packet by asserting an appropriate signal on line 1003. An input register 1004 receives the packet from the serial bus 838 and provides it to the FIFO over line 1006. PACDAC 840 has five separate FIFOs 1008–1016 for receiving different packet types. FIFO 1008 is a dual mode video 1/2 FIFO that can separately buffer both Video 1 and Video 2 packets. The FIFO can also be used as a single large FIFO for advanced processing including the generation of NTSC and/or PAL video signals. See application Ser. No. 08/337,350 (now U.S. Pat No. 5,790,110). FIFO 1010 is a graphics FIFO for receiving graphics pixel packets, FIFO 1012 is a cursor FIFO for receiving cursor pixel packets, FIFO 1014 is an I/O FIFO for receiving I/O write packets and FIFO 1016 is a control/timing FIFO for receiving timing structure packets.

Control/timing logic 1018 controls the overall operation of PACDAC 840. Timing atoms may be unloaded from control/timing FIFO 1016 and used by control/timing logic 840 to generate a variety of signals such as HSYNC 1020, VSYNC 1022, blank 1024 and LSYNC 850*b*. The number of states supported by control/timing logic 1018 is larger than the number supported by timing state machine 140 of FIG. 1. The structure of a timing atom for system 840 is shown in Table 126 of Appendix A. As shown in Appendix A (included in application but not printed with patent), a variety of additional timing states are provided for dual windowed video display and cursor graphics among other things.

In addition, the values of the PACDAC's internal registers ("I/O Reg") 1026 are provided to control/timing logic 1018 to generate control signals. I/O write logic 1028 unloads I/O write packets from I/O FIFO 1014 to update the values stored in I/O Reg 1026. The control/timing logic 1018 uses the timing atoms and I/O Reg values to provide a variety of control signals 1030 to the various stages of the PACDAC. The interconnection of these control signals is omitted from FIG. 10 for ease of illustration. Control/timing logic 1018 also generates a select signal on line 1032 to select which pixel information (video, graphics or cursor) is selected for display by color key/pixel MUX 1034.

Video, graphics and cursor data may be processed and displayed by PACDAC 840. Video 1 packets are unloaded by video 1 unpack logic 1036 and Video 2 packets are unloaded by video 2 unpack logic 1038. The video packets may be scaled by scaler 1040 and converted to the RGB color space by color space converter 1042. The resulting data is output to color key/pixel MUX 1034 and may be selected for display. The selected data is converted to analog form by DACs 1044 and provided to a display unit (not shown). PACDAC 840 also supports composite video generation as described in application Ser. No. 08/337,350 (attorney's file 11543-702) filed on Nov. 10, 1994 in the names of David C. Baker, Daniel P. Mulligan, and Eric J. Schell as joint inventors, titled "System and Method for Generating Video in a Computer System" (now U.S. Pat. No. 5,790,110), and which is hereby incorporated herein by reference. When generating composite video, dual mode video 1/2 FIFO 1008 is treated as a single FIFO and the video information is provided to run length decoder 1046. The run length decoder 1046 expands the composite video data (which is run length encoded). The expanded data is converted to analog form by DAC 1048 and output on line 842.

Graphics pixel information is unloaded from graphics FIFO 1010 and formatted by pixel unpack and format logic 1050. The formatted graphics information is used to look up RGB data in color palette 1052 which is provided to color key/pixel MUX 1034. The RGB data may be sent to DACs 1044 or may be output in VGA format on VGA port 1054. Similarly, cursor pixel information may be unloaded from cursor FIFO 1012 by cursor unpack logic 1056, used to look up RGB data in cursor palette 1058 which is provided to color key/pixel MUX 1034 for selective display.

It will be recognized that the overall operation of PACDAC 840 is similar to that described with respect to PACDAC 120 of FIG. 1, although PACDAC 840 supports additional packet types and more advanced processing options. System 800 also uses master control structures and timing structures in a manner similar to that described for the exemplary system of FIG. 1. Once again, however, additional packet types and advanced processing options are supported. Table 124 in Appendix A (included in application but not printed with patent) shows the format of master control structures used in system 800 and Table 127 shows the timing structure format.

Figure 11:
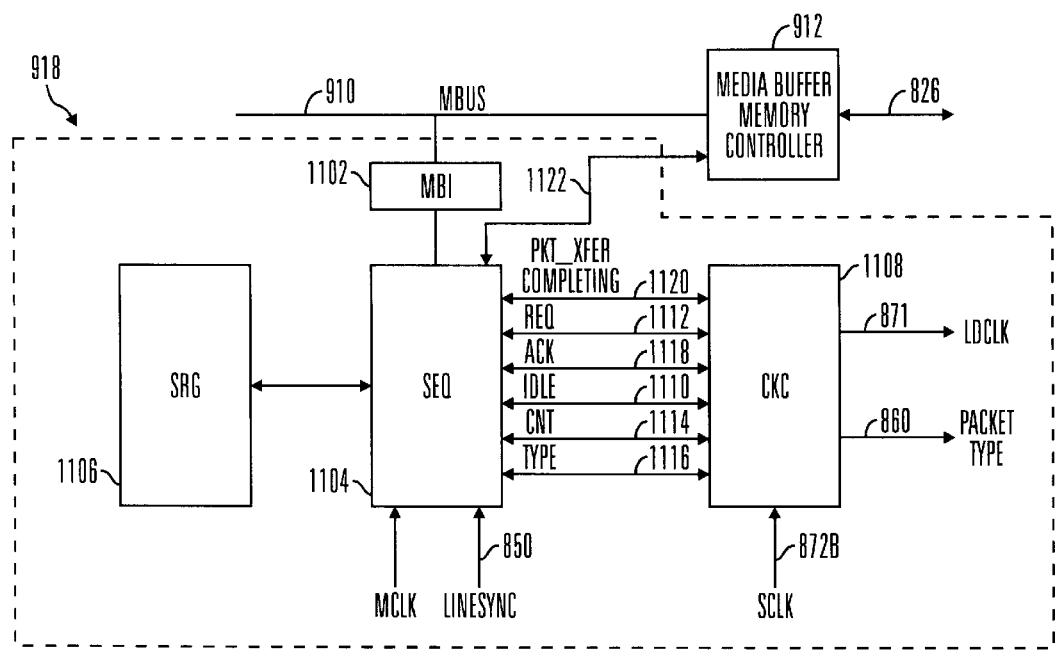
FIG. 11 is a block diagram showing in additional detail portions of one of the blocks shown in FIG. 9, this block being designated as "PACDAC Controller" in FIG. 9.

PACDAC controller 918 of media stream controller 814 (shown in FIG. 9) uses the master control structures and timing structures to control how media packets are sent to and processed by PACDAC 840. FIG. 11 shows the structure of portions of PACDAC controller 918 (indicated with dashed lines) used in media stream controller 814. PACDAC controller 918 includes a memory bus interface ("MDI") 1102, a sequencer ("SEQ") 1104, sequencer registers ("SRG") 1106, and a clock controller ("CKC") 1108.

The sequencer 1104 provides overall control of the PACDAC controller. It loads a master control structure and causes packets to be shifted out of display memory 828 for each horizontal display line. For each line, the sequencer sends packets in the order specified by the packet order field of the master control structure. The sequencer registers 1106 are used to store values loaded from the master control structure including a pointer and pitch for each type of data stored in display memory 828. As the sequencer 1104 sends packets to PACDAC 840, the pointer values in SRG 1106 may be incremented by the pitch to point to the next line of data. The clock controller 1108 is used to shift data out of a serial access memory in display memory 828 in accordance with signals provided by sequencer 1104. The clock controller 1108 also contains a DDA (such as that shown in FIG. 7) that is used to produce LDCLK 871. A serial clock ("SCLK") 872*b* is provided to CKC 1108 and may be periodically blocked (as described for the master clock in FIG. 7) to produce a modulated LDCLK 871. As described with respect to FIG. 7, this modulation may be used to control the data transfer rate across serial bus 838 for packets of a desired type in accordance with the master control structure.

At the top of each frame, the sequencer 1102 makes a request via MBI 1102 and Mbus 910 to media buffer memory controller 912 to load values from the master control structure in display memory 828. Sequencer registers 1106 include registers containing the addresses of two master control structures A and B and a control register that causes PACDAC controller 918 to toggle between the A and B master control structures after each frame (see discussion of Master Structure A Address Register, Master Structure B Address Register, PACDAC Controller Status Register, and PACDAC Controller Control Register in Appendix A (included in application but not printed with patent). Values indicating the packet order and the location and amount of data of each type in display memory are loaded into sequencer registers 1106 from the appropriate master control structure.

The sequencer 1104 loops through the packet order from the PKT_ORDR field of the master control structure (see Table 124 in Appendix A (included in application but not printed with patent) from least significant bit to most significant bit. The sequencer 1104 then calculates the display memory address for the data of the appropriate type. The sequencer 1104 then verifies that the clock controller 1108 is idle by checking idle line 1110. Then the sequencer 1104 makes a request on the Mbus 910 to the media buffer memory controller 912 to load the desired data for serially shifting onto serial bus 838. As discussed previously, display memory 828 is preferably a VRAM with a serial access memory (SAM) for serially shifting selected data onto serial bus 838. The request from sequencer 1104 causes the SAM to be loaded with data to be sent to PACDAC 840. When the sequencer 1104 receives an acknowledge signal ("ACK") from Mbus 910 it proceeds to shift the data out of the SAM in the display memory 828 and onto the serial bus 838. In one embodiment, the media buffer memory controller 912 may preacknowledge the sequencer a few cycles before the SAM has completed loading. The media buffer controller 912 can anticipate the amount of time it will take the sequencer to commence shifting, and can preacknowledge the sequencer so it begins shifting right after the SAM finishes loading.

The sequencer 1104 makes a request to the clock controller 1108 on REQ line 1112 to serially shift data out of the display memory 828. The sequencer 1104 provides a count of the number of dwords to shift out of the display memory 828 on CNT line 1114, and the type of the data (graphics, video, cursor, etc.) on type line 1116. The sequencer 1104 holds these signals until the clock controller 1108 returns an acknowledge ("ACK") signal on line 1118 indicating that it has received the request.

The clock controller 1108 then generates a LDCLK on line 871. On each cycle of the LDCLK, a dword of data is shifted out of display memory 828 onto serial bus 838 and is received by PACDAC 840. As discussed above, the LDCLK may be modulated to control the data transfer rate for selected packet types. The implementation described with respect to FIG. 7 may be used for this purpose.

In addition to modulating the LDCLK for graphics packets, system 800 allows the LDCLK to be modulated for I/O write packets. As discussed above, I/O write packets are used to update internal register values in PACDAC 840. Preferably, this is done during the vertical blanking interval. Since the vertical blanking interval is relatively long and requires low bandwidth, the data transfer rate for I/O write packets can be relatively low (e.g. 25 MHz) which allows a very small I/O FIFO 1014 to be used in PACDAC 840. As shown in Table 124 of Appendix A (included in application but not printed with patent) the "CLK_MOD" field includes 3 bits that are used to modulate the LDCLK for I/O write packets.

In addition, the clock controller 1108 asserts the appropriate packet type signal on line 860. The original count from line 1114 is loaded into a counter in the clock controller 1108 and is decremented after every LDCLK cycle. While the clock controller 1108 transfers the data, the sequencer 1104 calculates the address for the next set of data to be transferred. When the count is decremented to sixteen, clock controller 1108 asserts a signal on PKT_XFER_ Completing line 1120 which indicates that the transfer is almost complete. This signals the sequencer 1104 to reserve the Mbus 910, so the next set of data may be immediately loaded into the SAM of the display memory 828. An Mbus reservation signal may be sent to the media buffer memory controller 912 on lines 1122 which will reserve the Mbus 910 for the PACDAC controller 918 sixteen SCLK cycles in advance. When the count is exhausted, all of the data has been shifted out of display memory 828 and clock controller 1108 asserts a signal on idle line 1110 indicating that the requested transfer has been completed. The sequencer 1104 then causes the SAM to be loaded with the next set of data to be transferred and the process continues.

The above process may be repeated more than once for the same data type if the amount of data to be transferred exceeds the length of the SAM in the display memory. After each transfer by clock controller 1108, the pointer for the corresponding data type in sequencer registers 1106 may be updated to point to the address of the next data of the given type to be transferred. This process continues until the number of dwords indicated in the master control structure are sent for the given screen row (see the "X_CNT" fields in Table 124 of Appendix A (included in application but not printed with patent). When all of the data of a given type for the row has been sent, the sequencer updates the pointer using the pitch (see the "PTCH" fields in Table 124 of Appendix A (included in application but not printed with patent) so the pointer points to the start of the data for the next row.

For each row, the above process is repeated for each data type indicated by the packet order specified in the master control structure (see "PKT_ORDR" field in Table 124 of Appendix A (included in application but not printed with patent). Once all of the rows for a frame have been processed, the sequencer 1104 loads the master control structure for the next frame.

Figure 12:
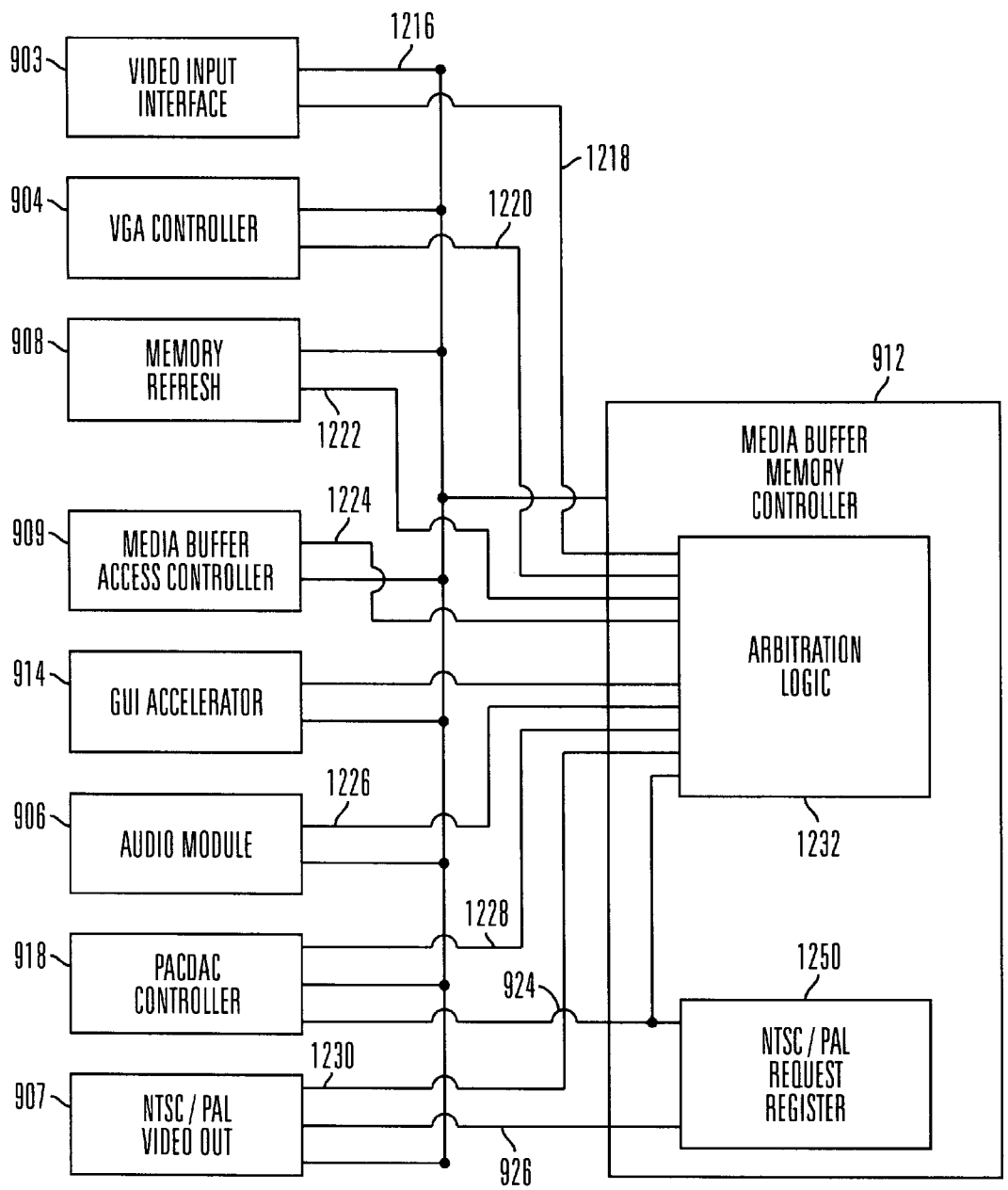
FIG. 12 is a block diagram showing in addition detail the Mbus and related portions of the media stream controller shown in FIG. 9.

The Mbus 910 is shared with the other functional modules in the media stream controller. It will be appreciated therefore that a bus protocol and priority scheme must be established for Mbus 910. FIG. 12 illustrates Mbus 910 in additional detail. A variety of functional modules 903, 904, 907, 908, 909, 914 and 918 are attached to the Mbus as bus slaves. Mbus 910 comprises tri-state lines 1216 shared by the modules as well as dedicated lines 1218–1230 for each module. Media buffer memory controller 912 includes arbitration logic 1232 for controlling access to the tri-state lines of the Mbus.

For each bus slave the dedicated lines 1218–1230 include write request, write acknowledge, read request and read acknowledge lines. To request a transfer, the requesting slave asserts either the write request (for a write to the display memory) or the read request (for a read from the display memory) and holds the line until the transfer has been completed and acknowledged on the corresponding acknowledge line.

The tri-state lines 1216 comprise 20 bits of Mbus address information, 32 bits of Mbus data information, a 3 bit Mbus type (which corresponds to the bus slave on the bus), and a 3 bit count indicating the number of dwords to be transferred. If the count is 0, a single dword is transferred and if the count is 7, eight dwords are sent in burst mode.

After a transfer is completed, the arbitration logic 1232 asserts an acknowledge signal on the appropriate acknowledgment line. The corresponding slave may drop its request if all of the desired data has been transferred, or it may hold its request if there is more data to transfer. If the request line is held, arbitration logic 1232 will continue to transfer and acknowledge data for the slave. However, after eight consecutive acknowledgments, the slave will drop its requests and hold it low for a memory bus clock cycle to allow other slaves an opportunity to use the bus. Thus, a slave will hold the bus for a maximum of eight transfers which, if burst mode is used, transfer 64 dwords.

If multiple slaves assert a request at the same time, arbitration logic uses a priority scheme based on the type of media to be transferred as described in FIG. 13. FIG. 13 is a chart with four (4) columns. The second (2nd) column in FIG. 13 separately lists the individual ones of the different slaves shown in FIG. 12. The first (1st) column in FIG. 13 indicates the priority allocated to each of the bus slaves. The fourth (4th) column in FIG. 13 indicates why each slave has received the priority allocated to it by arbitration logic 1232 shown in FIG. 12. The third (3rd column) in FIG. 13 indicates the response of each individual one of the separate slaves in FIG. 13 if such slave requests an Mbus transfer from arbitration logic 1232 but due to priority conflicts the transfer is not completed within the time required for processing of the corresponding media type.

An explanation of the chart in FIG. 13 follows:

1. As shown in FIG. 13, the PACDAC controller 918 has the highest priority. Because of this, any request by the PACDAC controller 918 for priority is never denied by arbitration logic 1232. The reason for this highest priority is that the PACDAC controller 918 controls the screen display as described above. If the PACDAC controller 918 did not have the highest priority, the display could be interrupted.

2. The memory refresh module 908 has the second highest priority. The reason for this priority is that the memory refresh module 908 provides for periodically refreshing the display memory 828. If the memory refresh module 908 is denied priority because of a simultaneous request from the PACDAC controller 918, the memory refresh module 908 holds the request and accumulates the refresh request.

3. The video input interface 903 has the third (3rd) highest priority. A high priority is desired to allow uninterrupted video processing. The video input interface 903 has only a limited ability to buffer incoming video data before sending it to the display memory. If the video data is not transferred frequently enough due to priority conflicts, the video input interface 903 drops its transfer request and drops a frame of buffered video in the video input interface 903 to make room for incoming data.

4. The audio module 906 has the fourth (4th) highest priority. The audio module 906 has this somewhat high priority because it is desirable to maintain the integrity of the audio information, particularly during playback. The priority of the audio module can be lower than the modules specified above because the audio information is recorded in the display memory 828 in bursts at a high rate and is reproduced from the display memory 828 at a relatively low constant rate. The sound information tends to accumulate in display memory 828 since the sound is being reproduced from the display memory 828 at a relatively slow constant rate. Thus, even though the recording of the audio information in the display memory 828 may be slightly delayed, it will not produce gaps because of the slow rate that audio is recovered from the display memory.

The audio module 906 has two (2) different responses, one for playback and another for record. When a transfer is not completed promptly for playback, the audio module holds the request and provides the sound information once the Mbus is free. The effect on sound quality, if any, is minor. The response of the audio module 906 during recording is to hold the request. If too much sound information is received before the transfer occurs, some of the sound information may be dropped by audio module 906 (i.e., some data may be overwritten by incoming data).

5. The NTSC/PAL video out module 907 has the next (or fifth (5th)) highest priority. The NTSC/PAL video out module 907 has a relatively low priority because it consumes a relatively high bandwidth. However, if the NTSC/PAL video out module 907 receives an acknowledgment after sending a request, it in effect retains a high priority until it has completed the transfer of the video information, because several other modules are disabled during composite video generation. During this time, all of the modules shown in FIG. 12 remain inactive except for the PACDAC controller 918 and the memory refresh module 908.

6. The media buffer access controller 909 has the sixth (6th) highest priority. The controller 909 has this relatively low priority because it deals with auxiliary information such as the position of the least significant bit in each byte or the choice of Windows or DOS as the virtual machine session. The virtual machine session will be described in detail subsequently in connection with the interrupt operation.

7. The VGA controller 904 and the GUI accelerator 914 have the lowest priorities. One reason is that they use relatively high bandwidths. Because of this, they will tend to dominate the transfer of information to the display memory 828 unless they are given low priorities. When data is not transferred promptly, they continue to hold their request until the request is acknowledged. It will be appreciated that the VGA controller 904 and the GUI accelerator 914 are mutually exclusive and will not be requesting the Mbus at the same time. This results from the fact that the VGA controller 904 responds to DOS as the virtual machine session and the GUI accelerator 914 responds to Windows as the virtual machine session (described further below). Because of this, the VGA controller 904 and the GUI accelerator 914 are shown in FIG. 13 as having the same priority.

Referring to FIG. 12, the PACDAC controller 918 (which has the highest priority and is responsible for transferring display data) has special lines 924 for communication with the media buffer access controller 912. As discussed previously with reference to FIG. 11, the PACDAC controller 918 may use lines 924 to reserve the Mbus sixteen serial clock cycles before the SAM has completed shifting data. This allows the SAM to be reloaded without delay after it is emptied, because the PACDAC controller 918 will not have to wait for ongoing Mbus data transfers to be completed.

Lines 924 also provide communication between media buffer memory controller 912 and PACDAC controller 918 to allow composite video from NTSC/PAL video out module 907 to be processed. When the NTSC/PAL video out module 907 makes a request to media buffer memory controller 912 to have composite video data transferred to PACDAC 840, the address of the composite video data and a count may be stored in a special register 1250 in the media buffer memory controller 912. The address and count are provided on special dedicated lines 926 between the NTSC/PAL video out module 907. After PACDAC controller 918 finishes processing each line of display data (according to the packet order in a master control structure as described above) it checks register 1250 in the media buffer memory controller 912 to determine whether composite video needs to be sent to PACDAC 828. PACDAC controller 918 then transfers the data using the address and count in register 1250 in a manner similar to that described above for other packet types. The count must be small enough so the composite video can be transferred before the next line of active display data needs to be transferred to PACDAC 840. NTSC/PAL video out module 907 will not request another serial transfer of composite video to PACDAC 840 until an acknowledgment is received from the media buffer access controller 912 on lines 926. Once an acknowledgment is received, NTSC/PAL video out module 907 will request another transfer when PACDAC 840 asserts a signal on VRDY line 850*a*.

The above described system provides for the seamless integration of graphics, video and sound into a single multimedia system. Format and processing may be flexibly controlled by software that provides control information and multimedia data to display memory 828. Priority schemes described above also help ensure multimedia integrity based on the importance of the different types of multimedia processing being performed. In addition, the above system is preferably a single bus device and uses a single interrupt line for processing different types of media. Aspects of the present invention related to interrupt sharing will now be described with respect to FIGS. 14–16.

Figure 14:
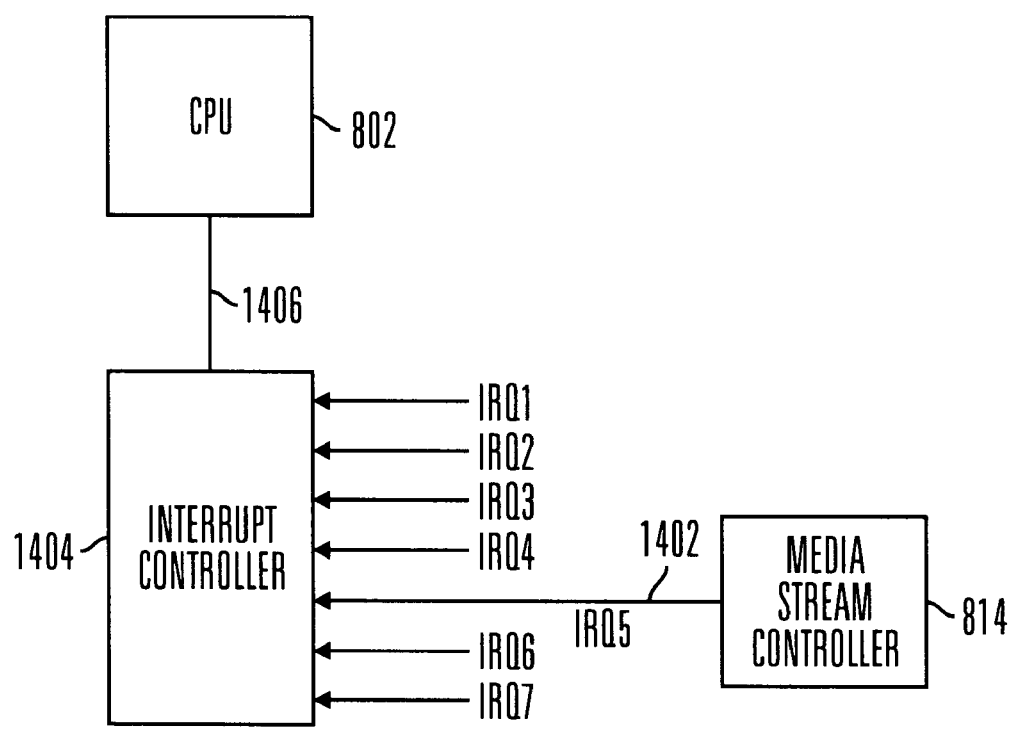
FIG. 14 is a block diagram illustrating interrupt connections that may be used for the system shown in FIG. 8.

FIG. 14 is a simplified block diagram illustrating the interrupt connection for system 800. A line 1402 extends from the media stream controller 814 to one of the input terminals of an interrupt controller 1404 As will be seen, the interrupt controller 1404 has a plurality of input terminals respectively designated as IRQ1–IRQ7. An interrupt line 1406 extends between the interrupt controller 182 and the CPU 802.

In order to manage the various media subsystems, an embodiment of the present invention preferably provides for the sharing of the interrupt line 1402 by the audio module 906, the video input interface 903 and the VGA controller 904 (graphics) as well as other components of the multimedia system described above. As shown in FIG. 14, the interrupt line 1402 extends from the media stream controller 814 to the interrupt controller 1404 to allow the media stream controller 814 to generate interrupt requests. As will be readily apparent to one of ordinary skill in the art, the media stream controller 814 and the associated software may be configured to use any of several interrupt request lines provided by the interrupt controller. In FIG. 14, the interrupt line 1402 has been designated IRQ5 for illustrative purposes. Upon receiving an interrupt request, the interrupt controller 1404 may communicate with the CPU 802 via the line 1406 For more information on interrupts, see Tom Shanley and Don Anderson, ISA System Architecture, PC System Architecture Series Volume 1 at 331–366 (MindShare Press 2nd ed. 1993) which is hereby incorporated herein by reference; Tom Shanley, EISA System Architecture, PC System Architecture Series Volume 2 at 27–34 (MindShare Press 2nd ed. 1993) which is hereby incorporated herein by reference; and Tom Shanley and Don Anderson, PCI System Architecture, PC System Architecture Series Volume 4 at 250–254 (MindShare Press 2nd ed. 1994) which is hereby incorporated herein by reference.

Interrupts may be generated in the system according to the invention for a variety of reasons relating to different multimedia services. For instance, the audio subsystem may produce interrupts to indicate that the volume is too high, that no AES device is connected, that the AES frequency is incorrect, or that an audio command requires processing. For the graphics subsystem, an interrupt may be generated to indicate that the video FIFO in the PACDAC has overrun or that vertical retrace is occurring. For the video capture subsystem, an interrupt may be generated to indicate that the subsystem has finished capturing a video structure. In addition, interrupts may be generated for the $I^2C$ bus to indicate that a master or slave device has sent or received a byte of data.

Figure 16:
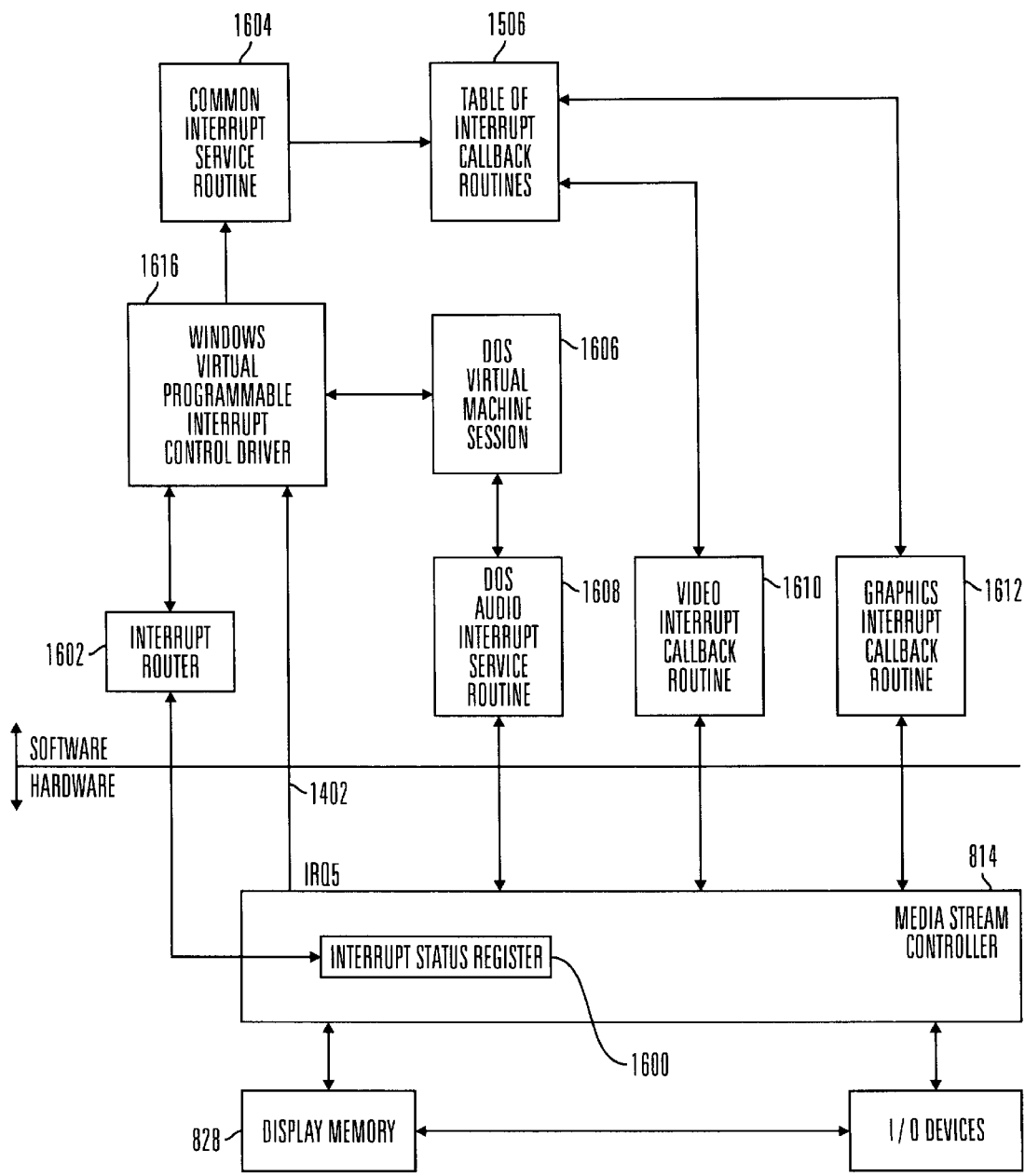
FIG. 16 is a block diagram, partly in software and partly in hardware, showing other features of a system according to the present invention for sharing a single interrupt line for processing different types of multimedia information.

As shown in FIG. 16, an interrupt status register 1600 is provided in the media stream controller 814. When an interrupt is generated by any of the above subsystems in this invention, the cause is recorded in the interrupt status register. A bit mask system is used, so causes for multiple simultaneous interrupts may be recorded. Referring to FIG. 14, the media stream controller 814 then generates an interrupt request on the line 1402 that is processed by the interrupt controller 1404.

The interrupt request is presented to the software as a single interrupt level, in this case IRQ5, regardless of the cause of the interrupt. Therefore, in the system of this invention, software is provided for interpreting and coordinating the processing of the interrupt request. It should be noted that the interrupt request may represent multiple simultaneous interrupt causes for different media subsystems. Further, these different services may be operating in different virtual machine sessions, such as DOS and Windows. Thus, interrupt processing may have to be coordinated for multiple media subsystems across different virtual machine sessions.

Referring to FIG. 16, this coordination is accomplished in the system of this invention by providing an interrupt router 1602 and common interrupt service routine (common ISR) 1604. The interrupt router 1602 provides a software routine that determines whether an interrupt should be routed to a DOS or Windows virtual machine session. The common ISR 1604 is an interrupt service routine that processes interrupts sent to Windows and coordinates the interrupt callback functions for the various interrupt causes. In order for the interrupt router 1602 and the common interrupt service routine (ISR) 1604 to accomplish their respective tasks, they are preferably provided with information regarding the media drivers and applications which are active at any given time. This information is provided through a process of registration which is illustrated in FIG. 15.

The process of registration differs for DOS and Windows virtual machines. For applications running under Windows, drivers are loaded for each desired media service, such as audio, graphics or video. In the system of this invention, a driver is preferably provided for each of the different subsystems controlled by the multimedia user interface. A representative driver 1500 is illustrated in FIG. 15 and is labeled as Windows media driver. Associated with each Windows media driver 1500 is a Windows media interrupt callback routine 1502 for processing interrupts caused by the corresponding subsystem of the media stream controller 814. For instance, the Windows media driver 1500 may be a VGA graphics driver, and the Windows media interrupt callback routine 1502 may contain code for processing graphics interrupts such as an interrupt caused by the vertical retracing of the display monitor. Since the Windows media interrupt callback routine 1502 will be used for interrupt processing, it is preferably in a fixed code segment to assure that it will be present in memory when the interrupt is generated. However, unlike interrupt service routines, the callback routines do not contain end of interrupt (EOI) or interrupt return (IRET) commands.

Figure 15:
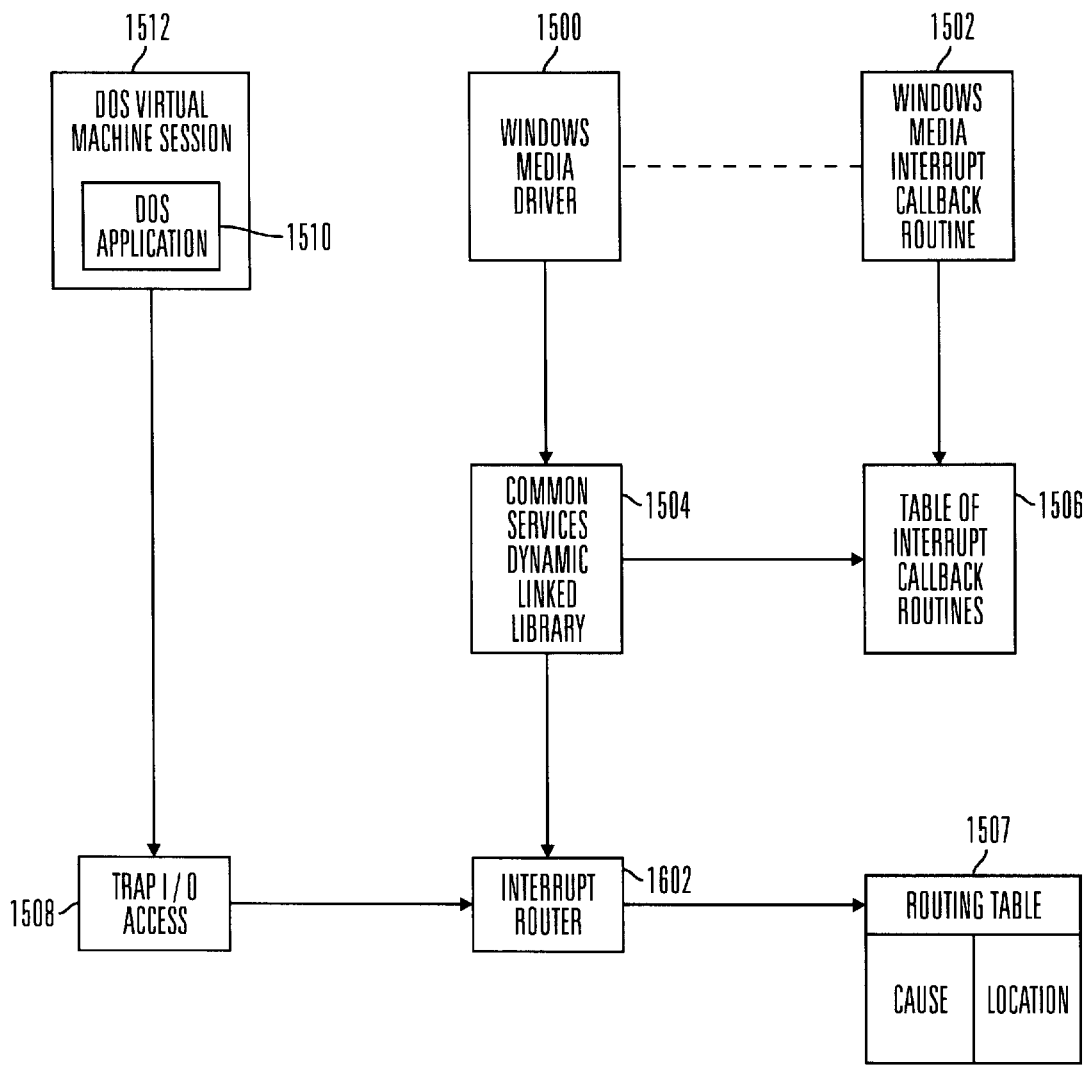
FIG. 15 is a block diagram illustrating how a single interrupt line may be shared for processing different types of multimedia information.

When the first Windows media driver 1500 is loaded, a dynamic linked library (DLL) designated as Common Services DLL 1504 in FIG. 15 is loaded. The common services DLL 1504 provides software routines that may be shared by the various Windows media drivers 1500. When additional Windows media drivers are loaded, they may use the shared software routines. Among the shared routines is a routine for registering the driver's associated callback routine. Upon being loaded, the Windows media driver 1500 calls the routine and provides parameters indicating a pointer to the interrupt callback routine 1502 and a bit mask indicating the interrupt causes that should be processed by that callback routine. For instance, a VGA driver would provide a pointer to the graphics callback routine and would provide a bit mask illustratively indicating that interrupts caused by vertical retracing of the CRT should be processed by this callback routine.

The common services dynamic linked library (DLL) 1504 then loads these values into a table of interrupt callback routines 1506. The table associates interrupt causes with interrupt callback routines for processing those interrupts. As shown in FIG. 15, when the Windows media driver 1500 is registered, a pointer to the corresponding Windows media interrupt callback routine 1502 is placed in the table of interrupt callback routine 1506. In addition, priority information may be placed in the table of interrupt callback routines if desired. This allows simultaneous interrupts to be processed according to the priority stored in the table. This may illustratively be based on (1) the cause of the interrupt, (2) the type of the media (such as audio, video, or graphics) or (3) the order of registration in the table. Of course, it will be readily apparent that other priority schemes could also be implemented.

When a driver is registered with the common services dynamic linked library (DLL) 1504, the driver is automatically registered with the interrupt router 1602 as well. The interrupt router 1602 maintains a routing table 1507 that associates an interrupt cause with the location of the callback function or interrupt service routine (ISR) for servicing that interrupt. For Windows media drivers 1500, the interrupt causes may be automatically registered as belonging to the Windows virtual machine session.

Registration for DOS virtual machines may be handled in a different manner. Not all DOS applications use drivers in a predictable fashion. Therefore, the loading of a driver is preferably not used as the trigger event for registering interrupt causes. Rather, access to the I/O ports of the media stream controller 814 may be trapped by the trap I/O access routine 1508 shown in FIG. 15. The ability to trap these access routines is provided by the CPU 802 which is preferably from the Intel x 86 family of CPU's.

As is known in the art, the CPU 802 may be configured such that a CPU exception occurs when the I/O address is accessed by the DOS application 1510. This causes the trap I/O access routine 1508 to be executed. The trap I/O access routine 1508 determines whether the address accessed belongs to a particular media subsystem (such as audio or graphics). It then registers all of the interrupt causes relating to that subsystem (such as all the VGA graphics interrupt causes) with the interrupt router 1602.

The interrupt router 1602 will then associate those causes in the routing table 1507 with the respective DOS virtual machine session 1512. The trap I/O access routine 1508 then disables trapping for that subsystem in that DOS virtual machine 1512. For example, after the DOS virtual machine session 1512 has been registered for graphics interrupts, the trap I/O access routine 1508 will no longer trap access routines to the graphics I/O addresses. The association in the routing table 1507 is maintained until the operation of the DOS virtual machine session 1512 terminates.

It will be readily apparent to those of ordinary skill in the art that the system of this invention allows different media services and different interrupt causes to be associated with multiple DOS virtual machine sessions 1512 and windows media interrupt callback routines 1502. For instance, an audio application could be running in one DOS virtual machine session using a conventional audio interrupt service routine (ISR), a graphics application could be running in a second DOS virtual machine session using a conventional graphics ISR, and a video application could be running under Windows in association with a video interrupt callback routine.

After the various drivers and media services are registered, interrupts may be processed under the control of the interrupt router 1602 and common interrupt service routine (ISR) 1604. FIG. 16 illustrates interrupt processing according to the system of this invention. For illustrative purposes, FIG. 16 assumes that an audio application is running under a DOS virtual machine session 1606 with an associated DOS audio interrupt service routine (ISR) 1608 and that video and graphics applications are running under a Windows virtual machine session with respective video and graphics interrupt callback routines 1610 and 1612.

As shown in FIG. 16 and described previously, the media stream controller 814 interacts with the display memory 828 and various I/O devices (such as PACDAC 840) to provide a variety of multimedia services. When an interrupt is generated, bits representing the cause or causes of the interrupt are placed in the interrupt status register 1600. Then an interrupt request is generated on the line 1402 in FIG. 14. This interrupt request is processed by the interrupt controller 1404 and is provided to a standard Windows virtual programmable interrupt control driver (VPICD) 1616 that is provided as part of Microsoft Windows. The Windows VPICD 1616 is configured using techniques known in the art to call the interrupt router 1602 for an interrupt request corresponding to the media stream controller 814. Normally, in conventional systems, the Windows VPICD 1616 is told to route an interrupt directly to a DOS virtual machine interrupt service request (ISR) or to a Windows ISR. However, in the system of this invention, there may be multiple causes for a single interrupt.

In the system of this invention, the interrupt router 1602 retrieves the cause or causes of the interrupt from the interrupt status register 1600. The interrupt router 1602 then looks up the interrupt cause or causes in the routing table 1507. If all of the interrupt causes are associated with Windows, the Windows VPICD 1616 will be instructed to send the interrupt request to Windows for processing. If all of the interrupt causes are associated with a single DOS virtual machine session 1512, the Windows VPICD 1616 will be told to send the interrupt request to that virtual machine session for processing.

If interrupt causes are detected that are associated with both a Windows and a DOS virtual machine session, the interrupt router 1602 will cause the Windows VPICD 1616 to pass the interrupt request to Windows. As will be described subsequently, when both Windows and DOS related interrupts are present, the Windows interrupt processing will first be performed by a common interrupt service routine (ISR) 1604 and then the common ISR will cause a second interrupt to be generated by the interrupt controller to allow for DOS interrupt processing. When this second interrupt is generated, the only interrupt causes remaining will be those that are to be processed by a DOS virtual machine session. During this second pass, the interrupt router 1602 will cause the Windows virtual programmable interrupt control driver (VPICD) 1616 to send the interrupt to the appropriate DOS virtual machine session 1606 for processing.

One additional combination of interrupt causes may be detected by the interrupt router 1602. It is possible that interrupts may be simultaneously generated for two separate DOS virtual machine sessions. Unlike Windows, no common interrupt service routine (ISR) is provided in DOS. Therefore, no simple mechanism exists to generate a second interrupt to process the second interrupt cause for the second DOS virtual machine session. In the presently preferred embodiment, however, only audio and graphics subsystems are supported under DOS. If simultaneous audio and graphics interrupts are generated for different DOS virtual machine sessions, the interrupt router 1602 preferably prioritizes the interrupt causes, so that the most critical interrupt is processed. For example, an audio command interrupt is given priority in the first embodiment over a graphics vertical retrace interrupt. With this priority, the audio command interrupt will be processed, but the graphics vertical retrace interrupt will not be processed at this time. However, the vertical retrace interrupt is repeated at regular intervals and can be processed the next time it is generated.

Thus, based on the nature of the different media being used, prioritization can be implemented. Factors such as importance of the interrupt and the noticeability of any error for that type of media (such as a flicker in the display monitor versus a gap in playing sound) can be considered when setting priorities. Generally, however, simultaneous interrupts in multiple DOS sessions will not occur. An alternative approach would be to have the interrupt router 1602 write a value to a register in the media stream controller 814 to indicate which interrupt cause was not serviced. Then the media stream controller 814 can automatically cause the interrupt to be regenerated.

Referring to FIG. 16, when the Windows virtual programmable interrupt control drive (VPICD) 1616 sends an interrupt to a DOS virtual machine session 1606, the appropriate interrupt service routine (ISR) may be automatically activated. For instance, in FIG. 16, the DOS audio ISR 1608 may be activated through a DOS table of vectors to interrupt service routines (ISRS). The DOS audio ISR 1608 may then interact with the media stream controller 814 to carry out audio processing and may terminate using an interrupt return (IRET) command.

When the Windows virtual programmable interrupt control driver (VPICD) 1616 sends an interrupt to the Windows system, the common interrupt service routine (ISR) 1604 is activated. The common ISR 1604 is provided as part of the common services dynamic linked library (DLL) 1504 and is loaded into the interrupt table to correspond to interrupt requests generated by the media stream controller 814. When the common ISR 1604 receives the interrupt from the windows VPICD 1616, it retrieves the interrupt cause from the interrupt status register 1600. It then looks up the corresponding interrupt callback routine in the table of interrupt callback routines 1506 and makes a call to the proper callback routine.

For example, in FIG. 16, the common interrupt service routine (ISR) 1604 may call the graphics interrupt callback routine 1612 when a vertical retrace interrupt is retrieved. The graphics interrupt callback routine 1612 will then be activated and may interact with the media stream controller 814 to carry out graphics related processing. When the processing is complete, the callback function returns to the common ISR 1604 which may look up callback routines for any remaining interrupt causes. For example, an interrupt may be simultaneously generated to indicate that a video structure has been captured. After the graphics interrupt has been serviced, the common ISR 1604 will then look up the video interrupt callback routine 1610 to process the video related interrupt.

By using the common interrupt service routine (ISR) 1604 with the table of interrupt callback routines 1506, only those routines corresponding to an interrupt cause will be activated. There is no need to traverse a linked list of inactive interrupt service routines (ISR's) to share the interrupt line 1402 as in conventional systems. Further, the order for activating callback functions can be altered based on the types of media drivers that are activated, the state of the system, or other criteria established by the common interrupt service routine (ISR) 1604. The critical nature of certain interrupt causes or the desired quality of each media could be used to prioritize processing.

Once the common interrupt service request (ISR) 1604 has called an interrupt callback routine for each interrupt cause, it will normally terminate by executing an interrupt return (IRET). However, in certain cases, the common interrupt service routine (ISR) 1604 may have to generate an additional interrupt to allow additional interrupt causes to be processed by the DOS virtual machine session 1606. This occurs when there are simultaneous DOS and Windows related interrupts. Windows processing occurs first and then a second interrupt may be generated to allow processing by a DOS virtual machine session 1606. This may be accomplished in several ways.

As is known in the art, interrupt request lines may be level sensitive or edge sensitive. For level sensitive interrupts, merely returning without clearing the interrupt will cause a second interrupt to be generated. For edge sensitive interrupt request lines, however, a transition is preferably caused on the line to trigger a second interrupt. This can be accomplished by disabling and then enabling the appropriate interrupt level in the interrupt controller 1404. This causes a transition on the interrupt request line 1402 and triggers a second interrupt. During the processing of the second interrupt, only DOS related interrupts will remain. The interrupt router 1602 can then tell the Windows virtual programmable interrupt control driver (VPICD) 1616 to send the interrupt to the DOS virtual machine 1606 for processing.

An alternative approach would be to have the common interrupt service routine (ISR) 1604 write a value back to the media stream controller 814 to indicate which interrupt causes were not serviced. Then the media stream controller 814 would automatically generate a second interrupt so that those interrupt causes could be processed.

Thus, the system according to the first embodiment allows the sharing of a single interrupt line by different media services. Interrupts may be coordinated across different interrupt callback routines and different virtual machine sessions. In addition, priority schemes may be implemented based on different interrupt causes as well as the nature of the different media services. This aspect of the present invention provides a basis for a unified multimedia bus device using a single bus interface and provides the advantages of limiting redundancy and increasing coordination among various media services.

The system and method of this invention have certain important advantages. They provide for the recording of commands and different types of multimedia information in the display memory. Some (e.g. graphics and audio) of these different types of multimedia information are transferred from the CPU main memory to the display memory. Other types of the multimedia information are transferred to the display memory from other sources than the CPU main memory. Transferring the different types of the multimedia information to the display memory is advantageous for a number of reason. For example, it eliminates the need for a number of separate display memories, each provided for an individual one of the different types of multimedia information. Since display memories are expensive when included in a system formed primarily from integrated circuit chips, the reduction of the number of the display memories in the system to a single display memory provides for a significant reduction in the cost of the multimedia system.

The system and method of this invention have other important advantages. For example, the system and method of this information provide a unified handling and processing of the different types of information under flexible software control. Because of this, the handling and processing of the different types of the multimedia information are integrated with one another in a consistent relationship. This is in contrast to conventional systems in which the different types of multimedia information are handled and processed in disparate and unrelated relationships.

There are other important advantages to the system and method of this invention. These advantages result in part from the fact that the information is provided in packets and that the packets are provided with a packet type identifying the type of media information. In this way, multimedia information can be easily and efficiently transferred to the display memory in accordance with the individual types of media involved in the transfer.

The system and method of this invention also provide priorities in the handling and processing of the different type of the multimedia information. For example, the system and method of this invention provide the highest priorities to the controllers which insure that the multimedia information will be constantly displayed on the display monitor. These priorities relate to the PACDAC controller and the memory refresh module. These controllers insure that the information in the display memory will be processed for display on the display monitor. Priorities lower than those specified above are also established for transferring the different types of the multimedia information to the display memory. These priorities further relate to the order in which the different types of the multimedia information will be transferred to the display memory when simultaneous requests are made to transfer such different types to the display memory.

Other advantages are obtained from the system and method of this invention. For example, a single interrupt line may be used. This interrupt line may use a single level for the different media. The use of the single level of interrupt may be coordinated for the different media services to provide a priority based upon the type of interrupt cause or type of media.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In a method of processing different types of multimedia information, the steps of:

providing the different types of the multimedia information including graphics, video and sound, providing a display memory, providing an interrupt to indicate simultaneous requests for the transfer of individual ones of the different types of the multimedia information to the display memory, loading a dynamic linked library with software routines, using the software routines in the dynamic linked library to load a table with interrupt callback routines for processing the simultaneous requests for the transfer of the individual ones of the different types of the multimedia information to the display memory, establishing priorities for the processing of the different interrupt callback routines in the table, and processing the different interrupt callback routines in the table in accordance with the priorities established for such different interrupt callback routines.

\* \* \* \* \*